(12) United States Patent
Kinigakis et al.

(10) Patent No.: US 6,688,080 B2
(45) Date of Patent: Feb. 10, 2004

(54) METHOD FOR MANUFACTURING FLEXIBLE PACKAGES HAVING SLIDE CLOSURES

(75) Inventors: Panagiotis Kinigakis, Buffalo Grove, IL (US); Kenneth Pokusa, Willowbrook, IL (US); Orestes Rivero, Skokie, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/994,255

(22) Filed: Nov. 26, 2001

(65) Prior Publication Data

US 2002/0152721 A1 Oct. 24, 2002

Related U.S. Application Data

(63) Continuation-in-part of application No. 09/836,984, filed on Apr. 18, 2001, and a continuation-in-part of application No. 09/945,557, filed on Aug. 30, 2001.

(51) Int. Cl.[7] .............................................. B65R 61/18
(52) U.S. Cl. .............................. 53/412; 53/450; 53/469; 53/132.4
(58) Field of Search ....................... 53/412, 450, 133.4, 53/139.2, 469, 550, 570; 493/213, 214, 927; 156/66; 384/64

(56) References Cited

U.S. PATENT DOCUMENTS

| | | | | |
|---|---|---|---|---|
| 3,534,520 A | * | 10/1970 | Moran | ......................... 53/570 |
| 4,090,017 A | | 5/1978 | McMahon et al. | |
| 4,355,494 A | | 10/1982 | Tilman | |
| 4,534,158 A | * | 8/1985 | McClosky | ................... 53/570 |
| 4,586,319 A | | 5/1986 | Ausnit | |
| 4,601,694 A | | 7/1986 | Ausnit | |
| 4,617,785 A | | 10/1986 | Chikatani et al. | |
| 4,646,511 A | | 3/1987 | Boeckmann et al. | |
| 4,709,533 A | | 12/1987 | Ausnit | |
| 4,727,709 A | | 3/1988 | Zieke | |
| 4,745,731 A | | 5/1988 | Talbott et al. | |
| 4,812,074 A | | 3/1989 | Ausnit et al. | |
| 4,848,064 A | | 7/1989 | Lems et al. | |
| 4,878,987 A | | 11/1989 | Van Erden | |
| 4,894,975 A | | 1/1990 | Ausnit | |
| 4,909,017 A | | 3/1990 | McMahon et al. | |

(List continued on next page.)

FOREIGN PATENT DOCUMENTS

| | | |
|---|---|---|
| EP | 0 443 867 A1 | 8/1991 |
| EP | 1 164 087 A2 | 12/2001 |
| JP | 55-89068 | 7/1980 |

(List continued on next page.)

OTHER PUBLICATIONS

International Search Report for EP 02 25 2742 of Jul. 9, 2002.

Primary Examiner—John Sipos
(74) Attorney, Agent, or Firm—Fitch, Even, Tabin & Flannery

(57) ABSTRACT

Horizontal form fill seal apparatus for making flexible packages with slider fastener closures is provided. A fastener track is applied in-line with a plastic web and is bonded thereto at the same time that a peel seal is formed. All package components are brought together at a turntable-mounted point of fill. With rotation of the turntable, final sealing operations are performed.

5 Claims, 26 Drawing Sheets

U.S. PATENT DOCUMENTS

| | | | |
|---|---|---|---|
| 4,945,714 A | 8/1990 | Bodolay et al. | |
| 5,010,627 A | 4/1991 | Herrington et al. | |
| 5,014,498 A | 5/1991 | McMahon | |
| 5,014,499 A | 5/1991 | Boeckmann | |
| 5,036,643 A | 8/1991 | Bodolay | |
| 5,080,747 A | 1/1992 | Veix | |
| 5,088,971 A | 2/1992 | Herrington | |
| 5,127,208 A | 7/1992 | Custer et al. | |
| 5,167,107 A | 12/1992 | Terminella et al. | |
| 5,179,816 A | 1/1993 | Wojnicki | |
| 5,238,306 A | 8/1993 | Heintz et al. | |
| 5,247,781 A | 9/1993 | Runge | |
| 5,322,579 A | 6/1994 | Van Erden | |
| 5,400,565 A | 3/1995 | Terminella | |
| RE34,905 E | 4/1995 | Ausnit | |
| 5,417,035 A | 5/1995 | English | |
| 5,505,037 A | 4/1996 | Terminella et al. | |
| 5,519,982 A | 5/1996 | Herber et al. | |
| 5,561,966 A | 10/1996 | English | |
| 5,564,259 A | 10/1996 | Stolmeier | |
| 5,664,406 A | 9/1997 | Smith | |
| 5,682,730 A | 11/1997 | Dobreski | |
| 5,687,549 A | 11/1997 | Jostler et al. | |
| 5,733,045 A | 3/1998 | Jostler et al. | |
| 5,743,070 A | 4/1998 | Lerner et al. | |
| 5,746,043 A | 5/1998 | Terminella et al. | |
| 5,768,852 A | 6/1998 | Terminella et al. | |
| 5,776,045 A | 7/1998 | Bodolay et al. | |
| 5,826,401 A | 10/1998 | Bois | |
| 5,845,465 A | 12/1998 | Bennett | |
| 5,845,466 A * | 12/1998 | Laudenberg | 53/570 |
| 5,884,452 A | 3/1999 | Bois | |
| 5,904,425 A * | 5/1999 | May | 493/214 |
| 5,906,438 A | 5/1999 | Laudenberg | 383/63 |
| 5,930,983 A | 8/1999 | Terminella et al. | |
| 5,937,615 A | 8/1999 | Forman | |
| 5,938,337 A | 8/1999 | Provan et al. | |
| 5,956,924 A | 9/1999 | Thieman | 53/412 |
| 5,983,594 A | 11/1999 | Forman | |
| 6,000,197 A | 12/1999 | Ausnit | |
| 6,029,428 A | 2/2000 | Terminella et al. | |
| 6,044,621 A | 4/2000 | Malin et al. | |
| 6,047,521 A | 4/2000 | Terminella et al. | |
| 6,071,011 A * | 6/2000 | Thomas et al. | 383/64 |
| 6,131,369 A | 10/2000 | Ausnit | |
| 6,131,370 A | 10/2000 | Ausnit | |
| 6,138,436 A | 10/2000 | Malin et al. | |
| 6,138,439 A | 10/2000 | McMahon et al. | 53/412 |
| 6,139,662 A | 10/2000 | Forman | |
| 6,148,588 A | 11/2000 | Thomas et al. | |
| 6,161,271 A | 12/2000 | Schreiter | |
| 6,178,722 B1 | 1/2001 | McMahon | |
| 6,185,907 B1 * | 2/2001 | Malin et al. | 53/133.4 |
| 6,199,351 B1 * | 3/2001 | Mount | 53/570 |
| 6,209,287 B1 | 4/2001 | Thieman | |
| 6,212,857 B1 | 4/2001 | Van Erden | |
| 6,216,423 B1 | 4/2001 | Thieman | |
| 6,219,993 B1 | 4/2001 | Linkiewicz | |
| 6,244,021 B1 | 6/2001 | Ausnit et al. | |
| 6,244,746 B1 | 6/2001 | Tokita et al. | |
| 6,286,189 B1 | 9/2001 | Provan et al. | |
| 6,292,986 B1 | 9/2001 | Provan et al. | |
| 6,293,896 B1 | 9/2001 | Buchman | |
| 6,327,754 B1 * | 12/2001 | Belmont et al. | 383/63 |
| 6,327,837 B1 | 12/2001 | Van Erden | |
| 6,360,513 B1 | 3/2002 | Strand et al. | |
| 6,363,692 B2 | 4/2002 | Thieman | |
| 6,364,530 B1 | 4/2002 | Buchman | |
| 6,389,780 B1 | 5/2002 | Coomber et al. | |
| 6,412,254 B1 | 7/2002 | Tilman et al. | |
| 6,427,421 B1 | 8/2002 | Belmont et al. | |
| 6,438,926 B1 | 8/2002 | Thieman | |
| 6,449,924 B2 | 9/2002 | McMahon et al. | |
| 6,470,551 B1 | 10/2002 | Provan et al. | |
| 6,474,045 B2 | 11/2002 | McMahon et al. | |
| 6,477,821 B1 | 11/2002 | Bois | |
| 6,481,183 B1 | 11/2002 | Schmidt | |
| 6,499,272 B2 | 12/2002 | Thieman | |
| 2001/0001164 A1 | 5/2001 | Van Erden | |
| 2001/0017950 A1 | 8/2001 | Strand et al. | |
| 2001/0039235 A1 | 11/2001 | Buchman | |
| 2001/0039783 A1 | 11/2001 | McMahon et al. | |
| 2001/0042357 A1 | 11/2001 | McMahon et al. | |
| 2001/0045083 A1 | 11/2001 | McMahon et al. | |
| 2001/0053253 A1 | 12/2001 | Buchman | |
| 2002/0017078 A1 | 2/2002 | Thieman | |
| 2002/0064321 A1 | 5/2002 | May | |
| 2002/0064322 A1 | 5/2002 | May | |
| 2002/0068668 A1 | 6/2002 | Chow et al. | |
| 2002/0118896 A1 | 8/2002 | Forman | |
| 2002/0134046 A1 | 9/2002 | Bois | |
| 2002/0134050 A1 | 9/2002 | Thieman | |
| 2002/0152719 A1 | 10/2002 | Kinigakis et al. | |
| 2002/0152720 A1 | 10/2002 | Kinigakis et al. | |
| 2002/0173414 A1 | 11/2002 | Leighton | |
| 2002/0178556 A1 | 12/2002 | McMahon et al. | |
| 2002/0184858 A1 | 12/2002 | Ausnit et al. | |
| 2002/0194818 A1 | 12/2002 | Thieman | |
| 2003/0074860 A1 | 4/2003 | Dutra | |

FOREIGN PATENT DOCUMENTS

| | | |
|---|---|---|
| JP | 61-259959 | 11/1986 |
| JP | 1-226556 | 9/1989 |
| JP | 4-173510 | 6/1992 |
| JP | 4-215954 | 8/1992 |
| JP | 5-91909 | 4/1993 |
| JP | 5-91910 | 4/1993 |
| JP | 7-112746 | 5/1995 |
| JP | 7-187202 | 7/1995 |
| JP | 9-216642 | 8/1997 |
| JP | 10-706 | 1/1998 |
| JP | 10-501714 | 2/1998 |
| JP | 10-503672 | 4/1998 |
| JP | 10-147352 | 6/1998 |
| JP | 10203539 A | 8/1998 |
| JP | 11-20051 | 1/1999 |
| JP | 11157553 A | 6/1999 |
| JP | 11-314648 | 11/1999 |
| WO | WO 98/24704 | 6/1998 |
| WO | WO 98/45180 | 10/1998 |
| WO | WO 01/96195 A1 | 12/2001 |

* cited by examiner

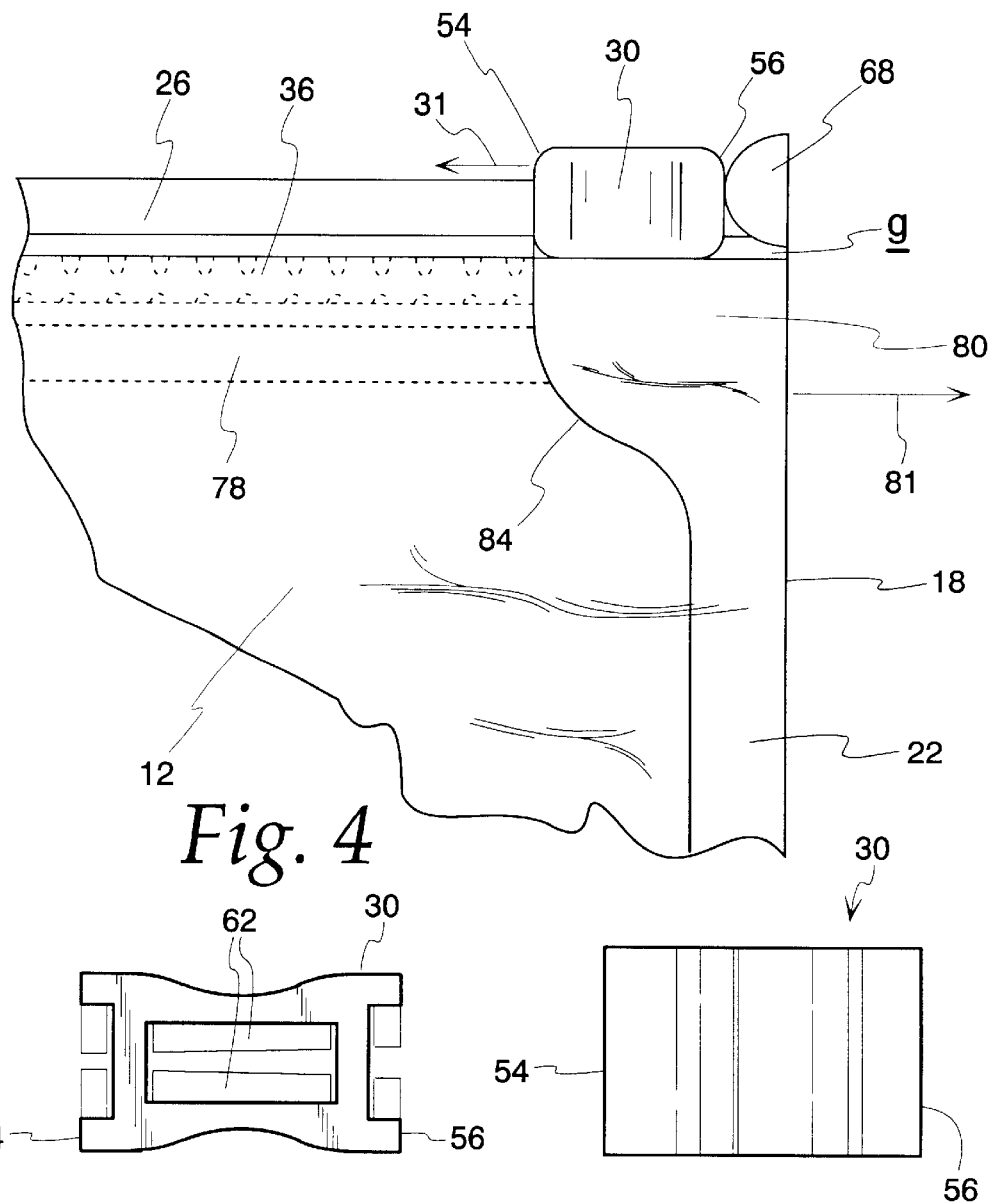
*Fig. 4*
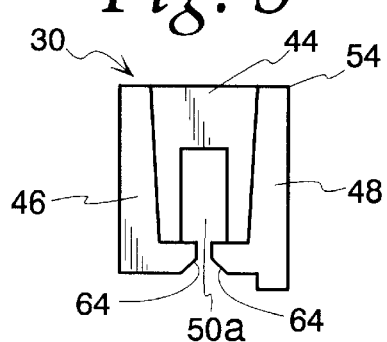
*Fig. 5*
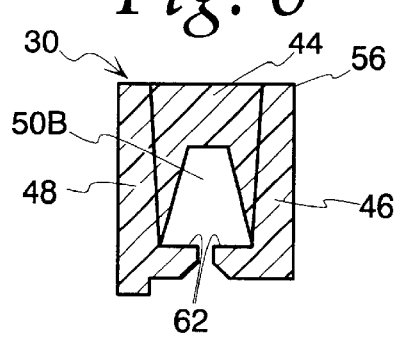
*Fig. 6*
*Fig. 7*
*Fig. 8*

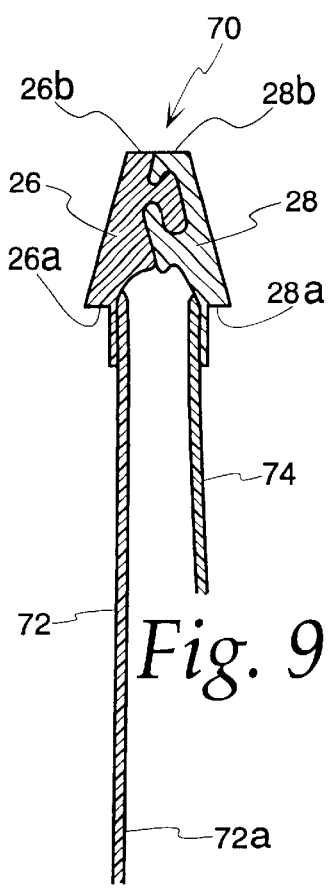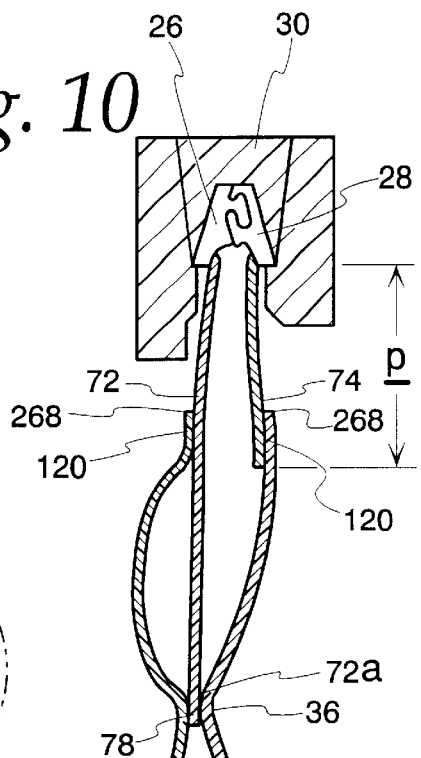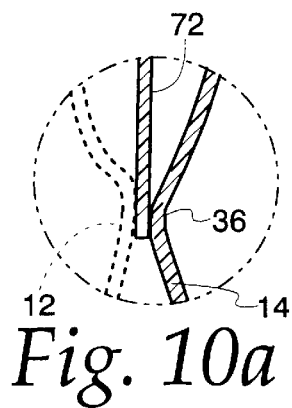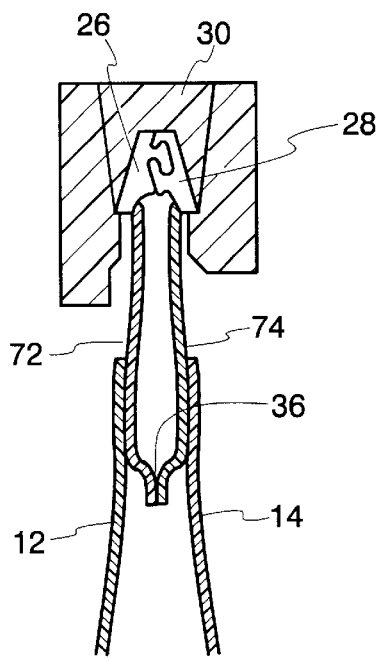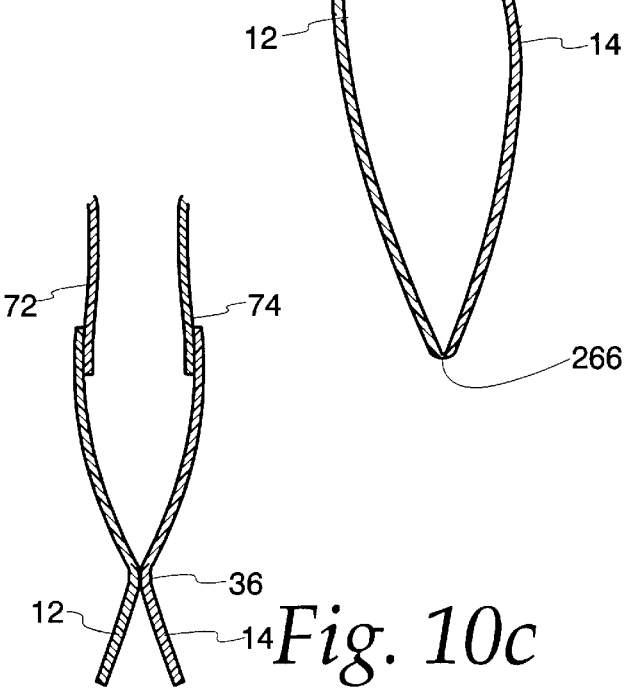

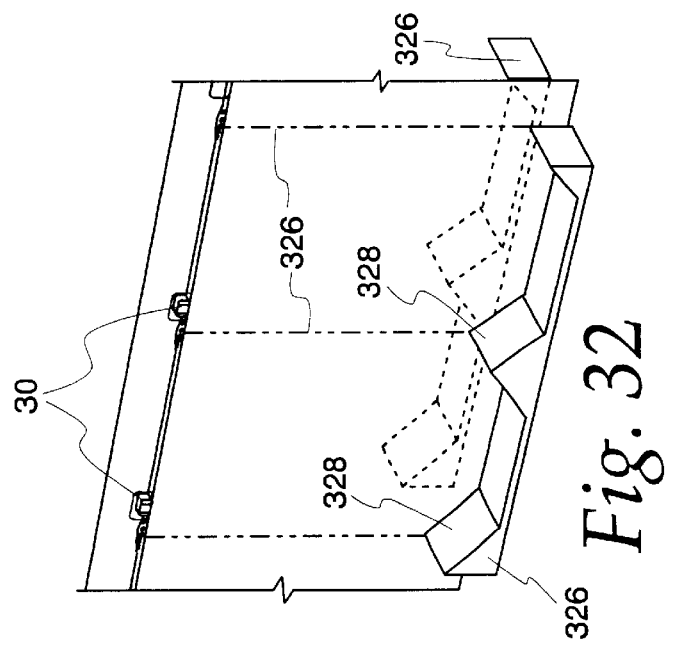
Fig. 32
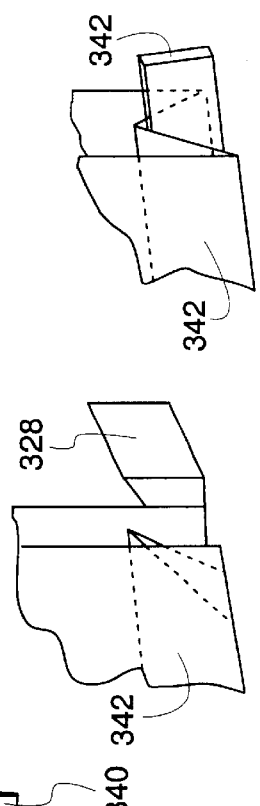
Fig. 31
Fig. 33
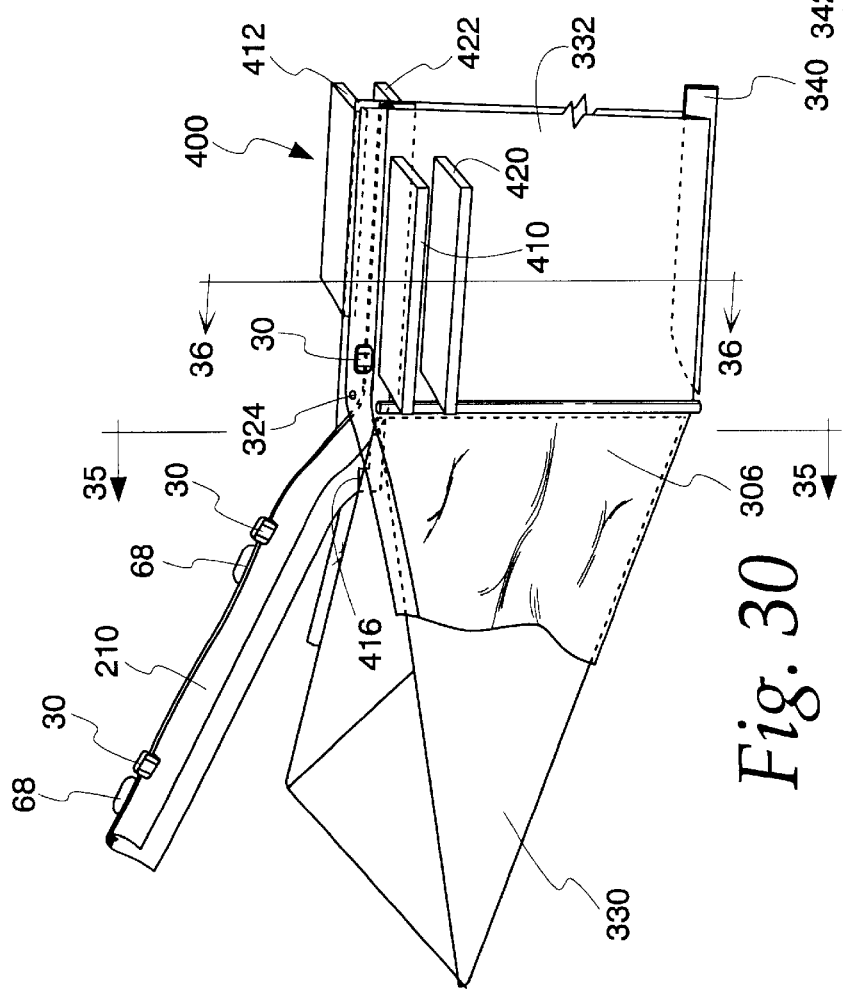
Fig. 30

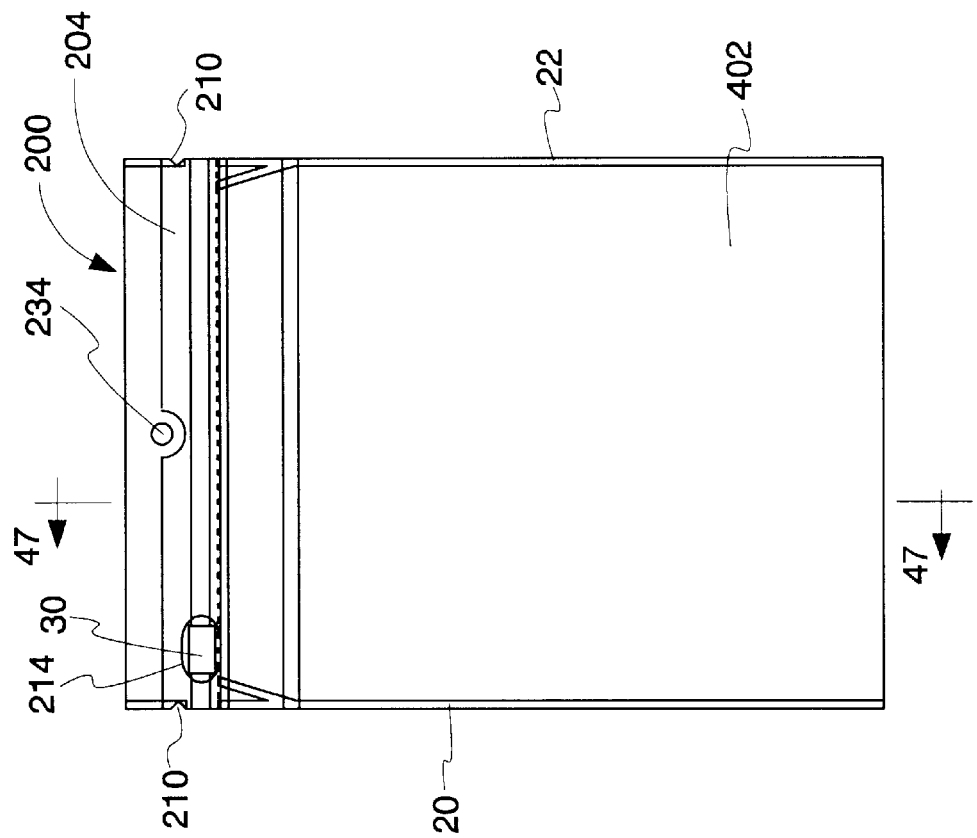

US 6,688,080 B2

METHOD FOR MANUFACTURING FLEXIBLE PACKAGES HAVING SLIDE CLOSURES

CROSS REFERENCE TO RELATED APPLICATIONS

This application is a continuation-in-part of U.S. patent application Ser. No. 09/836,984, filed Apr. 18, 2001, and U.S. patent application Ser. No. 09/945,557, filed Aug. 30, 2001, which is incorporated herein by reference in its entirety.

BACKGROUND OF THE INVENTION

1. Field of the Invention

The present invention pertains to the manufacture of flexible packages, such as plastic bags, and in particular to packages having fastener closures employing sliders.

2. Description of the Related Art

With the recent emphasis in providing consumers with bulk quantities of various commodities, such as food products, reclosable packages have become increasingly popular. One of the most popular means of providing reclosability is to employ zippers of various types, particularly zippers which are compatible with flexible packages of plastic film construction. Manufacturers of food products and other commodities are concerned with filling the contents of a flexible package as quickly and economically as possible. It is important that the opening provided by the fastener be made as large as practically possible. Consumers or other end users also prefer large sized openings for easy extraction of products from the package interior. Even with large openings, however, products within the package may interfere with fastener operation when product poured or otherwise dispensed from the package becomes entrained in the fastener components.

Other improvements to flexible reclosable packages are being sought. For example, when handling products comprised of numerous small pieces, such as shredded cheese or cereal, for example, it is generally desirable to have the package formed into a pouch which is open at one end, or along one side, so as to allow product to be poured or shaken through the reclosable opening. It is desirable that the product be allowed to freely flow past the reclosable opening. Preferably, the path taken by the product within the package should be made as smooth as possible.

Although improvements have been made in the art of plastic welding and joining, manufacturers of consumer products employing high speed production techniques are continually seeking improved package forming methods and equipment.

SUMMARY OF THE INVENTION

It is an object of the invention to provide apparatus for manufacturing improved, shrouded and unshrouded flexible packages.

Another object of the invention is to provide apparatus for making reclosable packages having fastener sliders which are protected as the package contents are poured out or otherwise extracted.

A further object of the invention is to provide apparatus for making a reclosable plastic package having a slider fastener with improved containment of the slider in a manner which also optimizes the size of the bag opening.

A further object of the invention is to provide apparatus for making a plastic bag having a slider fastener with an improved end "crush" stop of the fastener tracks.

These and other objects of the invention are provided in a horizontal form-fill seal machine for combined in-line and rotational manufacturing of food packages that have a shrouded mated fastener tracks with slider closures, that comprise a supply of web material which extends in an in-line machine direction and defines a serial succession of package sidewalls and extends in the machine direction. A supply of mated fastener tracks, that includes a first track with a shorter flange mated to a second track with a longer flange. A fold member that receives the web material. A web drive that transports web material over fold member in the in-line machine direction, and folds web material into overlying side-by-side portions, one against the other, to form a continuous succession of folded package portions that extends in the machine direction and has pairs of overlying first and second package sidewalls that have overlying free edges with shroud portions at the free edges. A slider member mateable with mated fastener tracks for movement along mated fastener tracks in opposite directions to open and close mated fastener tracks. A slider installation member inserting slider member onto mated fastener tracks. Fastener seal bars extending in the machine direction, sealing a portion of each flange of fastener tracks to first sidewall, leaving the flanges free to attach to the second package sidewall. Side seal bars extending at an angle to machine direction, sealing portions of a package sidewall together to form respective side seals of the food package. A filler member filling product into a package. A sidewall sealing member sealing second package sidewall to second track flange. A shroud seal member that seals the free edges of the package sidewalls to form a shroud that encloses the fastener tracks, to form a completed food package. A turntable member mounted filler member, side wall seal member and shroud seal member for movement in a rotational direction, and a transfer station mounted on the turntable for transferring completed food package away from the machine.

BRIEF DESCRIPTION OF THE DRAWINGS

FIG. 4 is fragmentary front elevational view showing construction of the flexible package;

FIG. 5 is a top plan view of the slider member;

FIG. 6 is a front elevational view thereof;

FIG. 7 is an elevational view from one end thereof;

FIG. 8 is an elevational view from the other end thereof;

FIG. 9 is an end view of a fastener track sub-assembly;

FIG. 10 is a cross-sectional view, in schematic form, taken along the line 10—10 of FIG. 1 with the slider moved to the left;

FIG. 10a is a fragmentary view, of FIG. 10 shown on an enlarged scale;

FIGS. 10b and 10c show alternative seal constructions;

FIG. 30 shows a portion of FIG. 29 taken on an enlarged scale;

FIG. 31 is a fragmentary view of the lower right corner of FIG. 30, taken on an enlarged scale;

FIG. 32 shows an operation performed on the bottom of the web portions;

FIG. 33 shows an alternative construction;

FIG. 39 shows an example of a flexible package constructed with apparatus according to principles of the present invention;

DETAILED DESCRIPTION OF THE PREFERRED EMBODIMENTS

Figure 1:
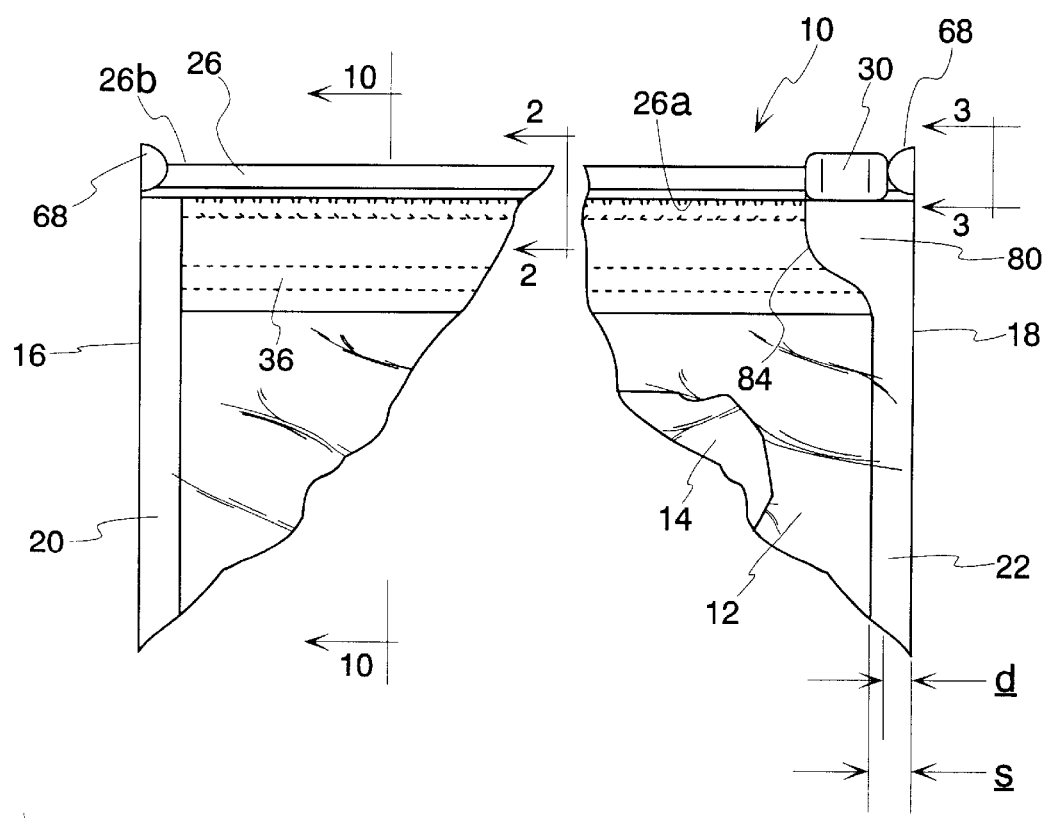
FIG. 1 is a fragmentary front elevational view of a flexible package according to principles of the present invention.

Referring now to the drawings and initially to FIGS. 1–8, an improved flexible package is generally indicated at 10. The terms "package" and "bag," are used interchangeably and are not intended to refer to any relative size of the finished item.

Flexible package 10 preferably comprises a plastic bag having front and back panels 12, 14 joined together at the left end by a side seal 20 and at the right end by a side seal 22. Side seal 20 is preferably of conventional conduction heat-sealed construction, having a generally constant width throughout. If desired, side seal 20 can be employed on both sides of the flexible package. Panels 12, 14 are further joined together at their bottom ends by a bottom seal 24 (see FIG. 10) extending between side seals 20, 22, as is known in the art. Alternatively, the bottom seal can be replaced by a fold line with panels 12, 14 being formed from a continuous sheet of plastic material.

Figure 2:
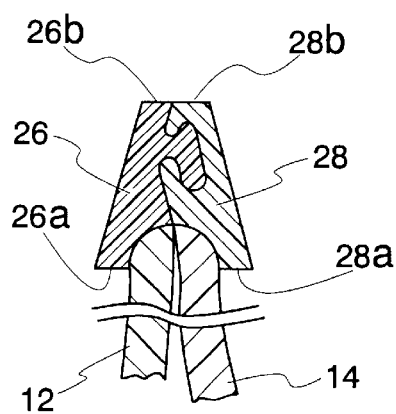
FIG. 2 is a fragmentary cross-sectional view taken along the line 2—2 of FIG. 1.

The upper end of flexible package 10 features a reclosable opening including a slide fastener arrangement with fastener tracks 26, 28 and a slider 30, all preferably of polyolefin material. The slider 30 is slidable along the fastener tracks, causing the fastener tracks to interlock or mate (as shown in FIG. 2) for closure of the flexible package and to unmate or separate to open the flexible package for access to contents in the package interior. As will be seen herein, features associated with the fastener slider arrangement allow an unprecedented enlarged opening of the flexible package. The enlarged package opening made possible by the present invention benefits manufacturers filling the package, as well as consumers dispensing product from the interior of the flexible package. In the preferred embodiment shown, the fastener tracks are also referred to as "zipper" tracks.

The flexible package according to principles of the present invention has found immediate commercial acceptance for use with food products, including perishable food products, such as cheese. Accordingly, it is generally preferred that the flexible package includes a hermetic seal 36 in the form of a peelable seal as taught in commonly assigned U.S. Pat. Nos. 5,014,856; 5,107,658 and 5,050,736, the disclosures of which are incorporated by reference as if fully set forth herein.

Figure 3:
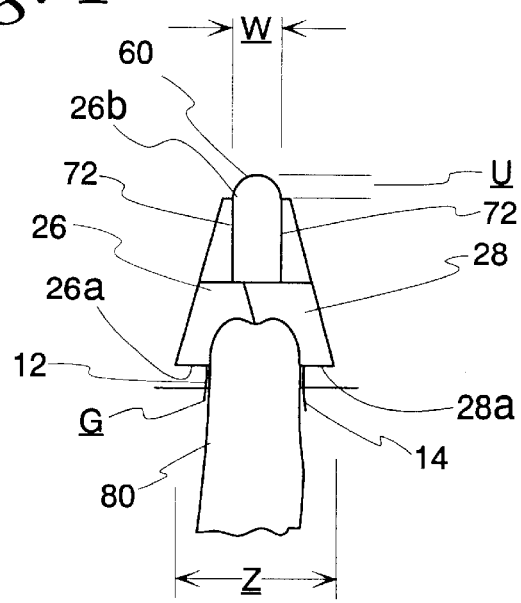
FIG. 3 is a fragmentary end view indicated by line 3—3 of FIG. 1.

As mentioned above, flexible package 10 preferably comprises a bag having panels 12, 14 formed from plastic sheet material. The sheet material can be of a single material type, such as polyolefin materials including polyethylene and polypropylene, but preferably comprises a laminate assembly of several different material types, as is known in the art to provide a barrier to moisture as well as certain gases, such as oxygen or inert fillers of the types used with food products. Other types of laminate films, such as those known in the art to preserve food freshness, may be employed. Where the contents of the flexible package are not perishable or where other considerations may dictate, the panels 12, 14 can be constructed without regard to gas or vapor barrier properties. FIGS. 2 and 3 indicate that it is generally preferred that the fastener tracks be joined to web-like flanges which, in turn, are joined to panels 12, 14 as will be described below with reference to FIG. 10.

Referring now to FIGS. 5–8, fastener slider 30 has a top wall 44, a shorter side wall 46 and a longer side wall 48, cooperating to define an internal cavity 50 for receiving the fastener tracks 26, 28. As can be seen by comparing the end views of FIGS. 7 and 8, a first end 54 of the slider defines a cavity which is generally rectangular. The opposed end 56 (shown in FIG. 8) defines a cavity which is generally arrowhead or A-shaped, as indicated by reference numeral 50b, conforming to the outline of the interlocked fastener tracks shown in FIG. 2. When the slider 30 of FIG. 1 is moved to the right, end 56 is at the leading end of the slider and the fastener tracks 26, 28 are unlocked, thus opening the flexible package 10. Conversely, as slider 30 of FIG. 1 is moved to the left, end 54 (shown in FIG. 7) is made the leading end, and fastener tracks 26, 28 are interlocked in the manner indicated in FIG. 2, to close the flexible package.

Referring again to FIGS. 2, 7 and 8, a number of features cooperate to maintain slider 30 captive on fastener tracks 26, 28. As can be seen for example in FIG. 8, a pair of upwardly facing stepped portions 62 are formed on either side of the slider cavity. Inwardly extending protrusions 64 are located at the other end of the slider. Protrusions 64 and stepped portions 62 engage the bottoms 26a and 28a (see FIG. 2) of fastener tracks 26, 28, as can be seen for example in FIG. 10. The engagement of the stepped portions 62 and the protrusions 64 with the bottoms of the fastener tracks prevents the slider from being upwardly dislocated from the fastener tracks.

Figure 13:
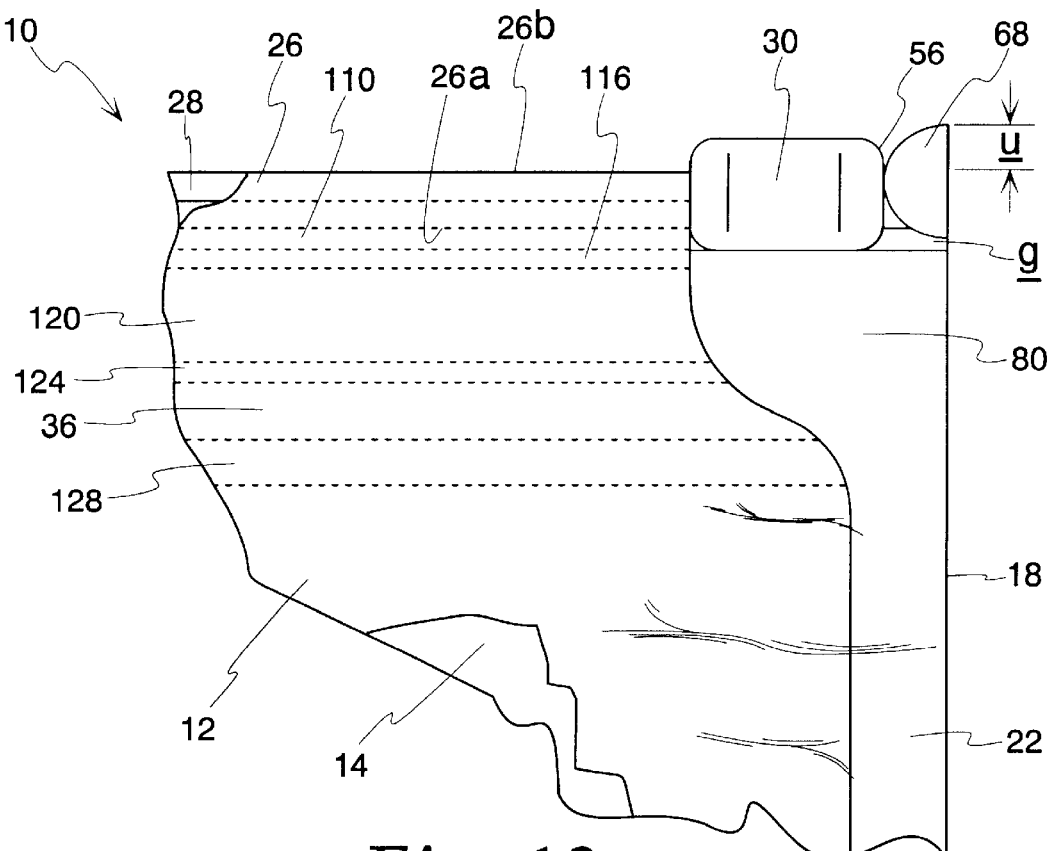
FIG. 13 is a fragmentary front elevational view of another flexible package according to principles of the present invention.

Referring to FIGS. 1, 3 and 13, the ends of the fastener tracks are deformed or "crushed" to form stops 68. Preferably, stops 68 are formed by the application of ultrasonically generated heat and pressure to the ends of fastener tracks 26, 28. It has been found that the use of present day conduction heat sealing techniques does not provide the control needed to attain the intricate, close tolerance design of stop members according to principles of the present invention. Further, it has been found that the use of present day conduction heat sealing techniques immediately adjacent previously formed stop members tends to distort the stop members, oftentimes to an extent rendering the stop members unacceptable from a quality control standpoint. As will be seen herein, stops 68 are configured for maximum efficiency, having the smallest front elevational surface area (i.e., the surface area visible in FIGS. 1 and 13, for example), which is adequate for containing slider 30 on the fastener tracks.

Referring to FIG. 3, the sides of the fastener tracks are softened and compressed at stop faces or sides 72 so as to impart a pre-selected width w and an upwelling displacement u above the upper surfaces 26b, 28b of fastener tracks 26, 28 (see FIG. 2). The material displaced above the upper surface of the fastener tracks interferes with the top wall 44 and ends of slider 30 to limit its sideways travel.

With reference to FIG. 3, the slider stop 68 (that is, the deformed portion of fastener tracks 26, 28) is carefully configured so as to avoid deformation of the bottom surfaces 26a, 28a of the fastener tracks. With reference to FIG. 1, the lower ends of the fastener tracks extend undeformed, substantially to the side edges 16, 18 of the flexible package 10. FIG. 1 shows slider 30 "parked" at a fully opened position, with end 56 contacting the stop 68 located at the right hand end 22 of the flexible package. Stop members 68 and the undisturbed bottom surfaces 26a, 28a of the fastener tracks in the area of stop members 68 cooperate to captivate slider 30 on the fastener tracks, preventing its unintentional removal from flexible package 10.

It is preferred that the bottom edges 26a, 28a remain undeformed also for that portion extending beyond slider 30, and underneath at least a portion of the right hand stop 68. With reference to FIG. 3, a gap g is formed between the bottom edges of the fastener tracks and the top portion 81 of side seal 22. As can be clearly seen in FIG. 3, the stop 68, formed by ultrasonic techniques, is separated by a substantial distance from the side seal, which is typically formed using conduction heat seal techniques found to be incompatible with the precise, high resolution ultrasonic techniques used to form stop 68. A second stop 68 formed at the left hand end 16 of flexible package 19 is constructed in a similar fashion and extends beyond the end 54 of slider 30 when the slider is moved fully to the left, closing the upper end of the flexible package. As will be explained in greater detail herein, separation of the "crush" operation performed on the fastener tracks to form stops 68 from the conduction heat sealing operation to form the enlarged side seals, allows stops 68 to take on a reduced size, effectively extending the size of the package opening, without sacrificing ability of the stops to effectively retain slider 30 on the fastener tracks.

Referring to FIGS. 1 and 4, side seal 22 includes an upper enlarged or tapered portion 80 having a width substantially greater than the lower end of side seal 22, sufficient to underlie the substantial entirety of slider 30 when the slider is fully moved to the "parked" position as shown in FIG. 1. The width of the enlarged, tapered portion 80 ranges between 200% and 400% (or more for very narrow side seals, e.g., 2 mm or less) of the width s of side seal 22 and most preferably ranges between 250% and 300% of the side seal width s.

Figure 11:
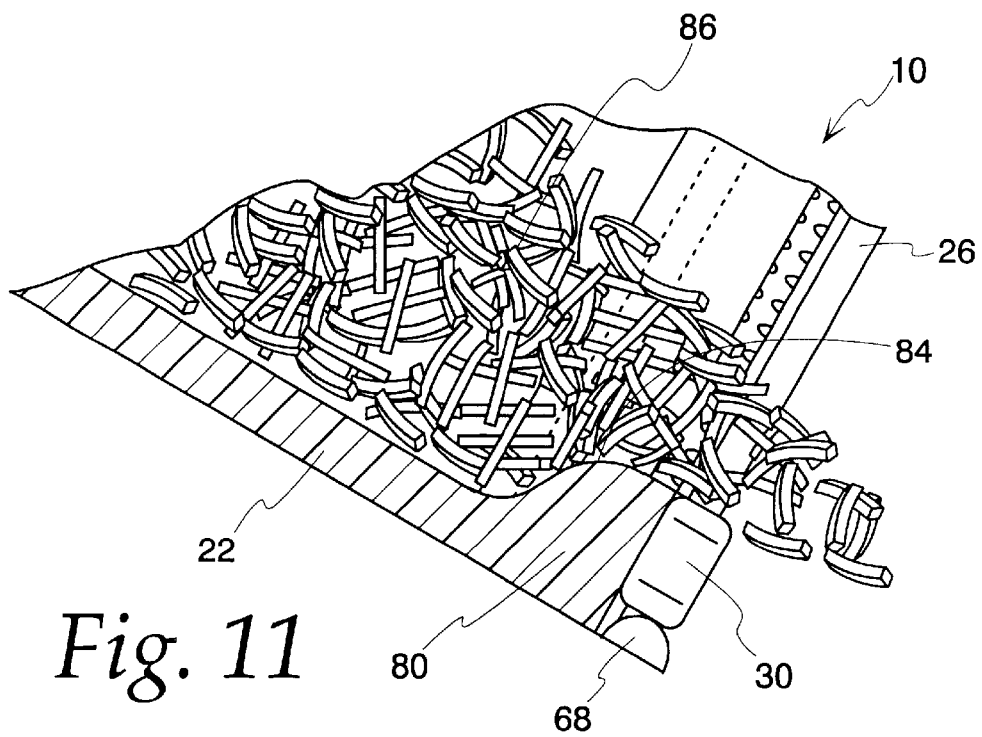
FIG. 11 is a fragmentary front elevational view showing contents being poured from the flexible package.

The enlarged, tapered end 80 of side seal 22 has a S-shaped or double re-entrant bend contour 84 which partly defines the package interior. With reference to FIG. 11, the curved edge 84 of the enlarged side seal portion 80 provides a smooth transition at the corner of the package opening, preventing product entrapment within the flexible package. As those skilled in the art will appreciate, the smooth transition at the opening corner is especially beneficial for flexible packages, where shaking techniques otherwise suitable for rigid packages, are rendered largely ineffective by flexible panels 12, 14 and especially panels of very thin, unsupported material which are likely to collapse in use.

Figure 12:
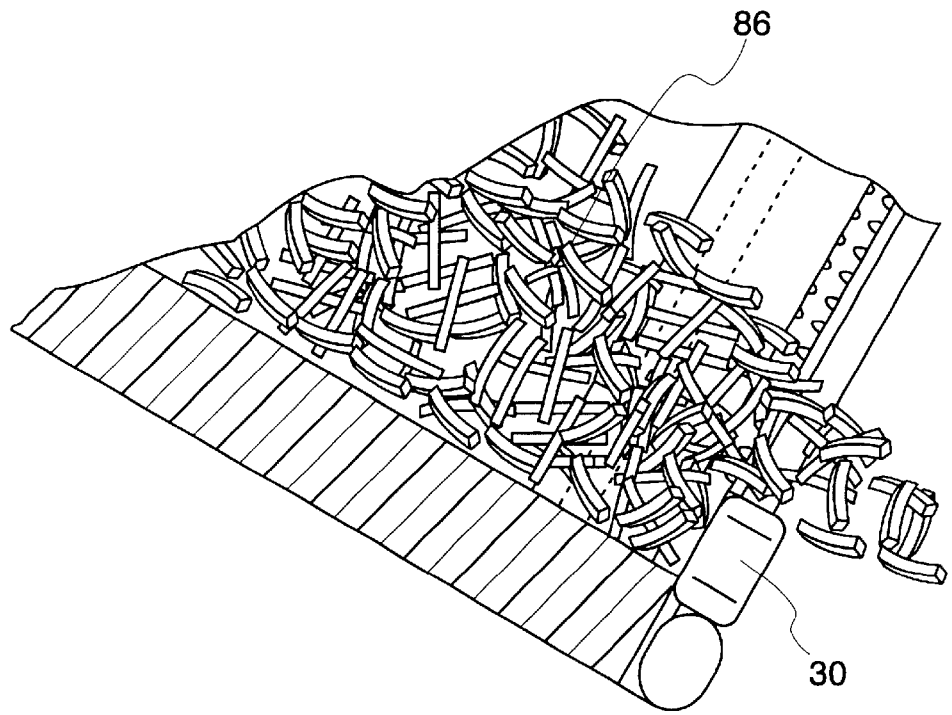
FIG. 12 is a fragmentary front elevational view showing contents of a prior art package.

The smooth transition provided by curved edge 84 also deflects or guides product 86 away from slider 30 as product is poured or otherwise removed from flexible package 10. This prevents contamination of mating surfaces of the slider and the fastener tracks, which would otherwise deteriorate the ability of slider 30 to move freely, performing interlocking and unlocking of the fastener tracks. As indicated in FIG. 12, in prior art arrangements product 86 is allowed to freely contact the bottom end of slider 30, a condition which is avoided by flexible packages according to principles of the present invention.

Preferably, fastener tracks 26, 28 are "crushed" to form stop member 68, using conventional ultrasonic heating equipment which allows for a highly accurate shaping of the stop member as well as withdrawal of the deformation area away from the bottom surfaces 26a, 28a as shown, for example, in FIG. 3. As can be seen for example in FIG. 1, the width of stop member 68 is considerably less than the enlarged tapered portion 80 of side seal 22, and preferably is of a smaller width than that of the narrower major portion of side seal 22. With reference to FIG. 1, the width d of stop member 68 is less than the width s of side seal 22. Preferably, stop member width d ranges between 50% and 200% of the width s of side seal 22. Preferably, the width w of the stop member 68 (i.e., the "crush" dimension) ranges between 25% and 80% of the width z of the fastener tracks, as illustrated in FIG. 3. The amount of upward displacement or upwelling u is approximately at least as great as the thickness of upper wall 44. It should be kept in mind that the total mass of the stop must be sufficient to hold the slider captive.

The stop member 68, in addition to having a reduced width d in front elevational view and a small width w in end view (see FIG. 3), has a sufficiently smaller mass and frontal surface area than stops employed in the prior art. This construction allows the slider 30 to be moved to an extreme position immediately adjacent the edge 22 of flexible package 10, thus maximizing the package opening, allowing for easier removal of the package contents. This reduced size of stop 68 also contributes to the precision of the ultrasonic heating and formation of the stop member, needed to attain required precise dimensions. Further, from a manufacturing standpoint, the dwell time to melt and shape the stop 68 is substantially reduced, contributing to the overall efficiency for the package manufacturer.

Prior art stop members have been formed by "crushing" the entire fastener profile, including the bottom surfaces 26a, 28a. In addition, even if ultrasonic techniques are employed for the stop member, prior art side seals (formed using conduction heat seal techniques and much larger, oftentimes three to four times larger than side seals according to the present invention) were typically overlaid with the stop, contributing to a substantial distortion of the stop structure. Even if the prior art side seals were made to stop short of the fastener tracks, the relatively high level of conduction heating in the immediate proximity of the stop have been found to cause a distortion of the stop, degrading control over its size and shape. These disadvantages are avoided with practice of the present invention, where the small, compact size of the stop is employed, and the gap g is formed between undeformed fastener bottom surfaces 26a, 28a and the enlarged seal portion 80.

Turning now to FIGS. 4, 9 and 10, and initially to FIG. 9, the fastener tracks are preferably formed from a subassembly generally indicated at 70 in which the fastener tracks 26, 28 are provided with corresponding fastener flanges 72, 74. The fastener flanges 72, 74 are coextensive with the fastener tracks 26, 28 and take the form of a plastic web to be heat sealed to the panels 12, 14. As can be seen in FIG. 9, fastener flange 74 is shorter in height than fastener flange 72, so as to accommodate the preferred hermetic seal arrangement shown in FIG. 10.

The fastener flanges 72, 74 are heat sealed to panels 12, 14. With reference to FIGS. 4 and 10, fastener flange 72 is welded or otherwise mechanically sealed to panel 12 at weld band 78. As shown at the upper portion of FIG. 10, the upper ends of panels 12, 14 are joined to the outer outwardly facing surfaces of fastener flanges 72, 74 at points intermediate the fastener tracks and peelable seal 36. Band 36 preferably comprises a hermetic peelable seal formed by the joinder of panel 14 to the inside face 72a of fastener flange 72 (see FIGS. 10 and 10a). Panel 12 is sealed to the opposite outside face of the fastener flange as schematically indicated in FIG. 10. In FIG. 10a the components of the peelable seal 36 are shown, with film 12, which plays no part in the preferred peelable seal, being shown in phantom.

Variations of the peelable seal are also contemplated by the present invention. For example, in FIG. 10b, the flanges 72, 74 of the fastener arrangement are joined with a peelable seal. The upper ends of these flanges are heat sealed to panels 12, 14 as shown. In FIG. 10c a further alternative is shown with the peelable seal 36 being formed at the joinder of lower portions of panels 12, 14. The upper portions of panels 12, 14 are heat sealed to fastener flanges 72, 74.

As will now be appreciated, the enlarged, tapered end portions 80 of side seal 22 cooperate with other features of flexible package 10 to provide a number of important advantages. More specifically, the enlarged tapered end portions 80 provide a smooth transition of the interior of flexible package 10 preventing product entrapment in the slider and fastener track surfaces when product is poured or otherwise dispensed. In addition, the enlarged tapered portion 80 helps to secure slider 30 about tracks 26, 28 by maintaining a clearance from bottom surfaces 26a, 28a of the fastener tracks. Further, the enlarged tapered portions 80 of side seals 22 strengthen and rigidify edge portions of panels 12, 14 in the immediate area of the parked position of slide 30.

Often, the greatest amount of force applied by the user to slider 30 occurs at the closing of the slider, when the fastener tracks are unlocked or separated from one another. When the slider 30 is in the middle of its travel along the fastener tracks, the user is provided with a sensation of the proper direction of slider movement. However, when the slider 30 is in the parked position, and especially in the "parked open" position shown in FIG. 1, the user's initial application of force may be misdirected. The enlarged tapered portion 80 provides added stiffness and rigidity to the flexible package at the initial point where pressure is applied to the slider, thus further contributing to the assurance that secure engagement will be maintained between slider 30 and the tracks 26, 28.

With reference to FIG. 4, a consumer desiring to close the flexible package will grasp the enlarged side seal portion 80, pulling in the direction of arrow 81 while pulling or pushing slider 30 in the direction of arrow 31. The added stiffness and rigidity offered by enlarged side seal portion 80 is provided at a point of optimal effectiveness to react in an appropriate manner to forces applied to slider 30 and to overcome any resistance of the tracks 24, 26 to resume a mating, interlocked condition as the fastener tracks are interlocked. Those skilled in the art will appreciate that the "rolling resistance" or dynamic resistance to movement of slider 30 is oftentimes lower than the initial static resistance, opposing movement of the slider away from the fully opened parked position shown, for example, in FIG. 4.

The added stiffness and rigidity imparted to the flexible package 10 and especially panels 12, 14 by enlarged side seal portion 80 results in other advantages when lightweight panels 12, 14 are employed. For example, panels of the single polyolefin type where no laminate film (such as PET or NYLON) is used to stiffen and support the support panel, have oftentimes excluded the use of sliding zippers, since minimum stiffness and rigidity needed to operate a fastener slider was not available. However, with enlarged side seal portions according to principles of the present invention, adequate stiffness is provided, even for lightweight, so-called "single" films.

As indicated in FIG. 10, flanges 72, 74 are joined to respective panels 12, 14, preferably at their lower ends, so as to prevent product from entering between flange 72 and panel 12, as well as between flange 74 and panel 14. In certain applications this may not be a critical requirement. In FIG. 10, the upper portion of panel 12 is shown for illustrative purposes as spaced from the lower end of flange 72. In practice, it is generally preferred that this spacing be eliminated, with panel 12 being in intimate contact with flange 72. Similarly, any gap between panel 14 and the lower end of fastener flange 74 is preferably eliminated. Although it is most preferred that the peelable seal be formed by joining panel 14 to fastener flange 72, the peelable seal, preferably a hermetic seal, can be formed between the fastener flanges 72, 74 or directly between the panels 12, 14, although these alternative constructions are less preferred than the arrangement shown in FIG. 10.

Turning now to FIG. 13, flexible package 10 is shown constructed with the panels 12, 14, side seal 22, upper enlarged side seal portion 80 and fastener tracks 26, 28, as described above. The fastener tracks 26, 28 are preferably joined to flanges 72, 74 (not visible in FIG. 13). FIG. 13 schematically illustrates commercial fabrication of flexible package 10. As will be appreciated by those skilled in the art, practical commercial assembly requires recognition of tolerances of the equipment and materials used to construct a viable commercial product. For example, tracks 26, 28 are ultimately mechanically coupled to panels 12, 14 using conduction heat seal tooling. A gap 110 shown in FIG. 13 represents the tolerance range or margin of error for tool alignment used to secure the fastener tracks 26, 28. As mentioned, it is preferred that the upper end of enlarged side seal portion 80 be spaced below the lower ends of the fastener tracks, such as the lower end 26a of fastener track 26 visible in FIG. 13. Further, it is preferred that the gap g continue beyond the end 56 of slider 30.

A gap 116 represents a tolerance range or margin of error for the desired positioning of the upper end of enlarged side seal portion 80, to provide clearance for the bottom edge of slider 30. As illustrated in FIG. 13, the upper end of enlarged side seal portion 80 falls at an outermost limit of its tolerance range. Preferably, the upper end of enlarged side seal portion 80 is within the gap 116, rather than to one end thereof. The gap 116 also accounts for any cant or angular mis-positioning or mis-alignment where the upper end of side seal 80 may be angled slightly from a position parallel to the fastener tracks, as may be encountered in a practical commercial environment.

A band 120 shown in FIG. 13 represents a conduction heat seal of the fastener flange to the panels 12 or 14. This conduction heat seal 120 provides the principal mechanical attachment of the fastener track assembly to the package panels. Band 36 is the peelable seal, preferably a hermetic seal, between panel 14 and fastener flange 72. A gap 124 represents the desired production spacing between production seal 120 and peelable seal 36. The remaining band 128 represents the production tolerance range or margin of error for positioning of peelable seal 36 with respect to the package panels.

In one commercial embodiment, flexible package 10 comprises a plastic bag having a width of approximately 6.5 inches from side edge to side edge and a total overall height of approximately 10.75 inches. The fastener tracks 26, 28 have a height of approximately 4 millimeters, with gaps 110, 116 each having a height of 2 millimeters. As shown in the upper right hand corner of FIG. 13, stop 68 projects a distance u above the top edge of the fastener tracks. In FIG. 13, only the top edge 26b is visible. With reference to FIG. 10, the upper ends of panels 12, 14 are preferably spaced a distance p from the bottom edges of the fastener tracks, ranging between 2 and 3 millimeters. The conduction heat seal 120 and the peelable seal 36 each have a height of 6 millimeters, and gap 124 located between the two, has a height of 2 millimeters. The desired spacing between conduction heat seal 120 and peelable seal 36 has a maximum value of 2 millimeters and a minimum value required to prevent overlap of the conduction heat seal and peelable seal. The side seal 22 has a width ranging between 3 and 8 millimeters and the stop 68 has a width (see reference character d in FIG. 1) ranging between 2.0 and 8.0 mm. As can be seen with reference to FIG. 13, the upper end of side seal 22 is spaced a substantial distance below the upper edge of the flexible package. This spacing ranges between a minimum value equal to the combined height of the fastener tracks and gap 110, and a maximum value equal to the combined height of the fastener tracks, gap 110 and gap 116.

Figure 14:
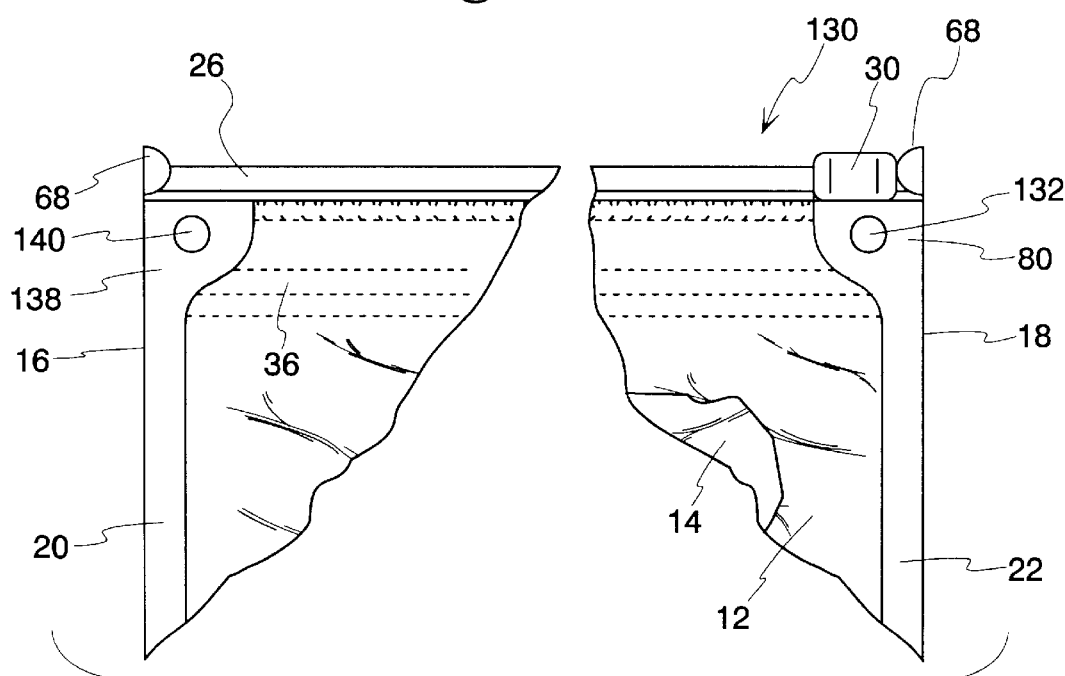
FIG. 14 is a front elevational view of another flexible package according to principles of the present invention.

Referring to FIG. 14, several alternative features are shown with reference to a flexible package 130. The right hand portion of flexible package 130 is identical to flexible package 10, described above, except for the addition of a peg hole 132 formed in the enlarged side seal portion 80. Flexible package 130 has a left side seal 20 as described above with respect to FIG. 1. However, in the flexible package 130, the upper end of side seal 20 is enlarged at 138 in a manner similar to that of enlarged side seal portion 80. An optional peg hole 140 is formed in the enlarged side seal portion 138. Although the peg holes 132, 140 are shown having a circular shape, virtually any shape (e.g., oval) can be used, as well. Peg holes 132, 140 can be formed by punching before or after the side seals are fully formed, it being preferred that the upper ends of the side seals provide a complete sealing of the panels and other components of the flexible package. It will be appreciated by those skilled in the art that the holes add heat relief to the enlarged side seal portion. This helps preserve the uniformity of the tapered area and of the dimensioning of gap g, as well as the uniformity of shrinkage which helps control manufacture on a production basis. If desired, the heat sealing die can be made hollow in the region of the peg holes, even in the absence of peg hole features to attain further heat relief advantages. It may also be preferable in some instances to form the peg holes 132, 140 as part of the formation of the side seals using, in effect, a thermal cutting or thermal punching technique. With the inclusion of two peg holes 132, 140, flexible package 130 can provide an improved presentation of art work or other indicia carried on the panels of the flexible package.

It is generally preferred that textual and graphic information be oriented generally perpendicular to the side edges of the flexible package. If only one peg hole is provided, the package will tend to hang rotated in a vertical plane, according to the distribution of product within the flexible package. With support given to two peg holes 132, 140, the flexible package is oriented in an upright position, making it easier to read the text and graphical information carried on the package. If desired, the text and graphical information printed on the rear panel can be inverted so that a consumer can "flip" the package to inspect the rear panel, without having to remove the package from the support pegs passing through peg holds 132, 140.

Although the package opening, fastener tracks and related features are shown at the upper end of the flexible package, the present invention is intended to cover arrangements in which the opening and related structure is provided on the side or bottom of the flexible package.

Figure 23:
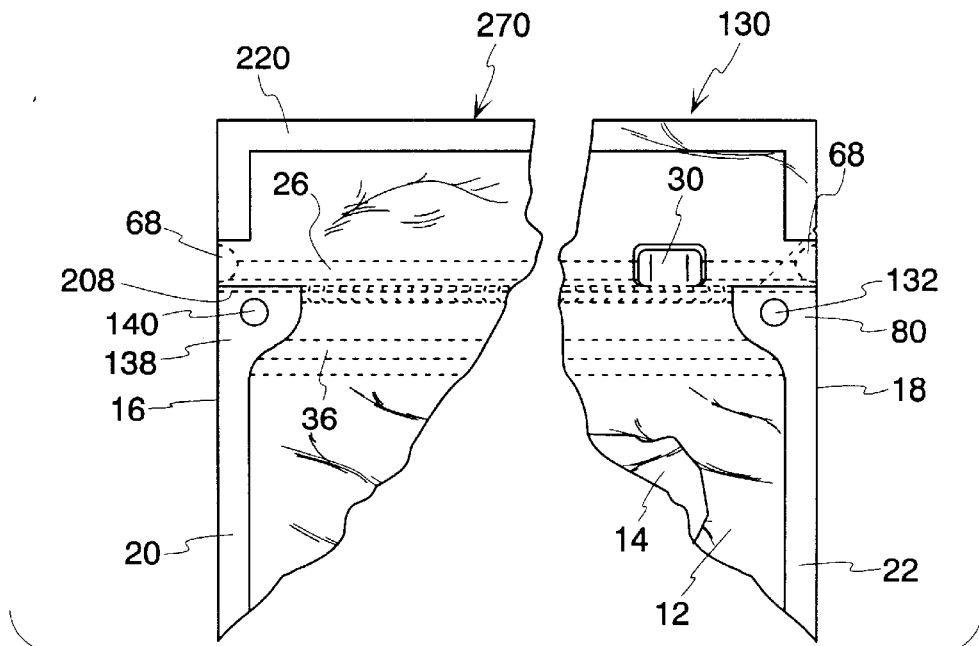
FIG. 23 is a fragmentary elevational view of an additional embodiment of a shrouded flexible package.
Figure 24:
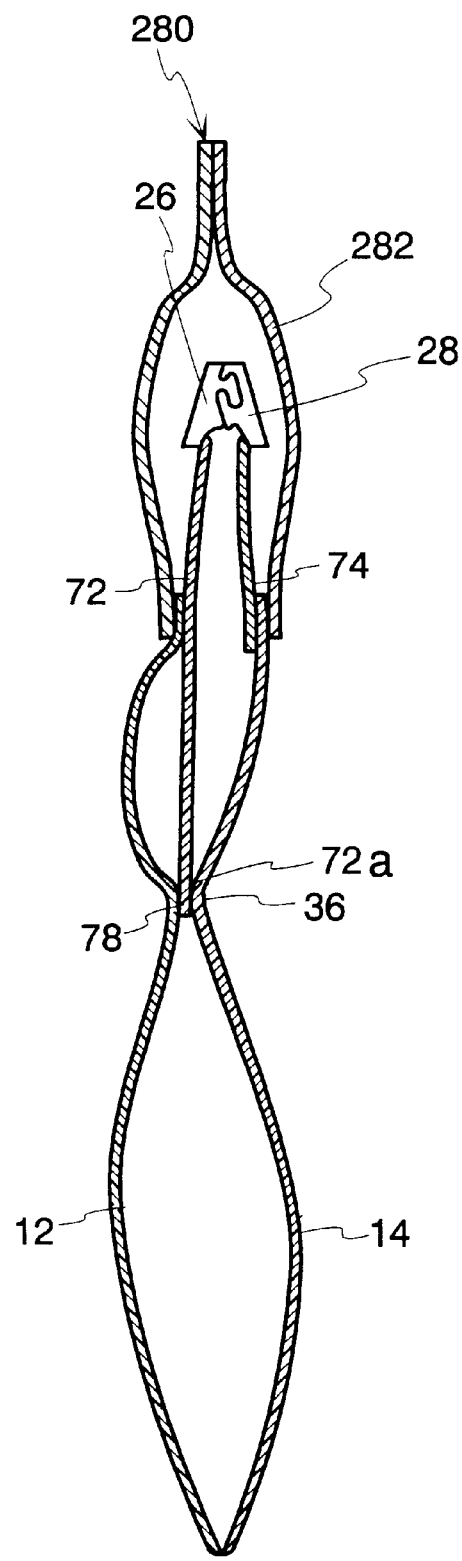
FIG. 24 is a cross-sectional view similar to that of FIG. 20 but showing an alternative shroud construction.
Figure 25:
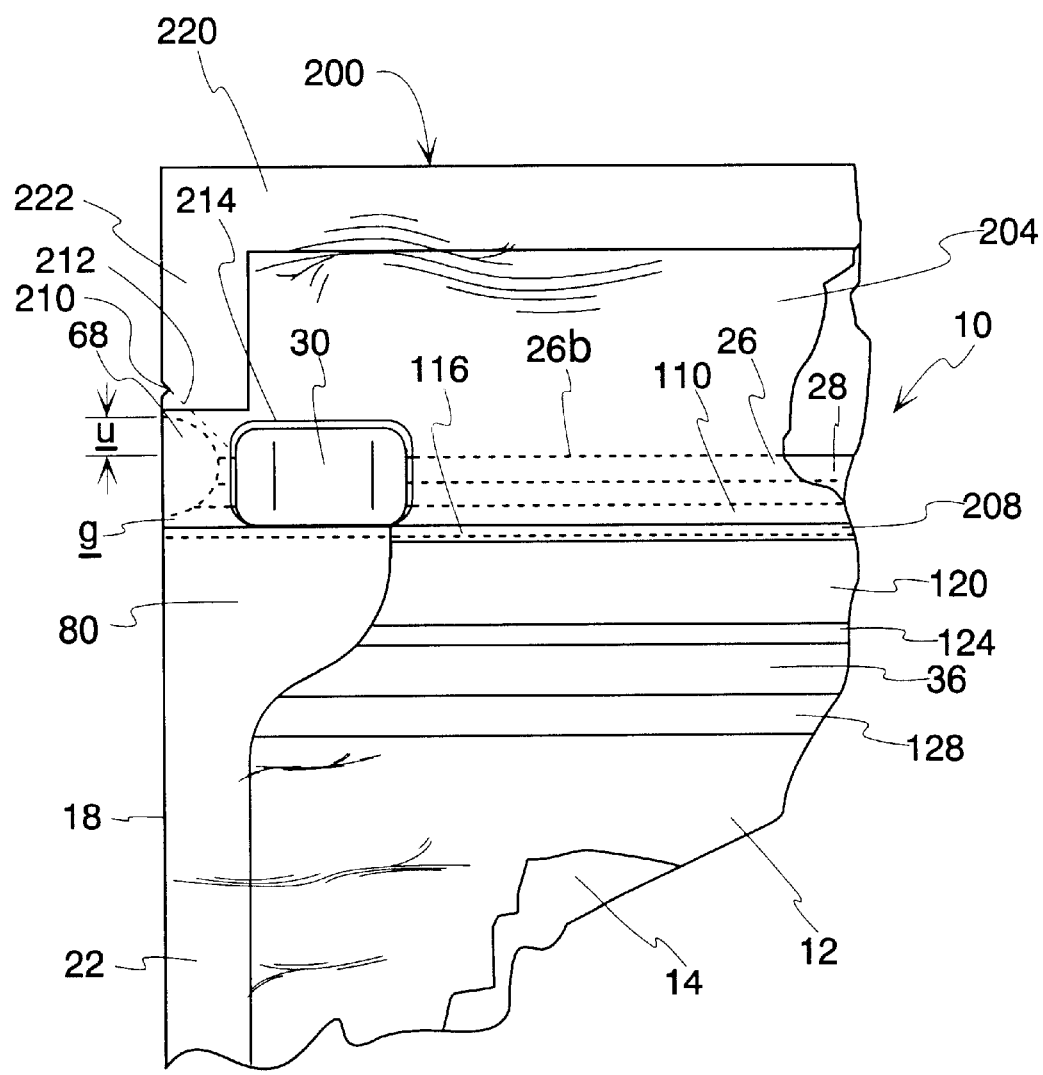
FIG. 25 is a fragmentary elevational view of a further embodiment of a shrouded flexible package.

Referring now to FIGS. 15–25 and initially to FIG. 25, an improved package according to principles of the present invention, is shown. Package 199 includes the features of flexible package 10, described above and in addition includes a shroud portion 204 extending above line of weakness 208 formed in panels 12, 14. Line of weakness 208 can be formed using available conventional techniques, and is preferably formed, using laser scoring techniques. Preferably, line of weakness 208 extends across the width of flexible package 199, from one side edge to the other. As shown in FIG. 25, line of weakness 208 extends to edge 18, located at side seal 22. If desired, side seal 2 can be replaced by side seal 20.

Preferably, shroud 204 is made for easy tear-away removal in an intuitive manual operation not requiring special directions. Preferably, a notch 210 is formed in edge 18, and is located slightly above stop 68. An optional angled or diagonal line of weakness 212 extends from notch 210 to an opening 214 which surrounds slider 30. Opening 214 is illustrated as a rectangle with rounded corners. Opening 214 can however take on other shapes, such as that of a circle or teardrop, for example. Opening 214 relaxes the strain in the shroud portion of the flexible package caused by relatively large-sized slide members. It is preferred that the opening 214 be formed in the web prior to joining with fastener tracks. Accordingly, careful registration of the opening 214 is needed to insure the desired finished flexible package is produced.

Preferably, slider 30 is located at a fully closed position along the fastener tracks and is surrounded by opening 214 at the closed position. In order to gain access to the package contents, a user grasps the upper edge of shroud 204 causing an initially tearing at notch 210. Tearing continues along diagonal line 212 and enters opening 214, continuing along opening 214 to line 208. With continued tearing across the width of package 199, the shroud 204 is removed, leaving a package substantially similar to the packages described above in FIGS. 1–14.

Referring again to FIG. 25, shroud 204 includes an upper fin seal 220 and a side fin seal portion 222. Preferably, the upper fin seal 220 inside fin seal 222 are formed in separate sealing operations and are made to slightly overlap one another for package integrity and sealing of the package interior. The bottom of side fin seal 222 is terminated at or slightly above end stop 68. It is most preferred that side fin seal 222 be terminated slightly above end stop 68 to avoid interfering with the controlled formation of the end stop which, as pointed out above, has a shape and position providing novel advantages. Notch 210 in the preferred embodiment shown in FIG. 25 is formed at the lower end of side fin seal 222. If desired, notch 210 could be formed in a gap between end stop 68 and a side fin seal shortened with respect to the side fin seal illustrated in FIG. 25.

Figure 15:
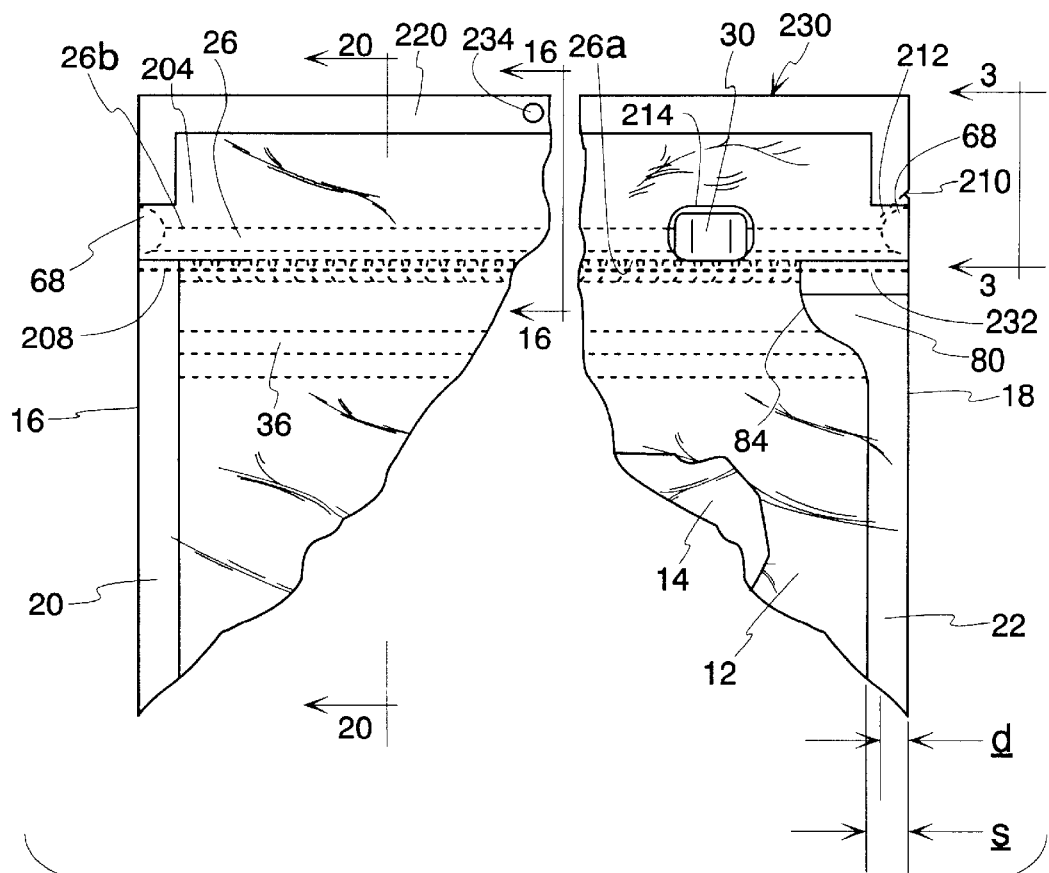
FIG. 15 is a fragmentary elevational view of a shrouded flexible package constructed according to principles of the present invention.
Figure 16:
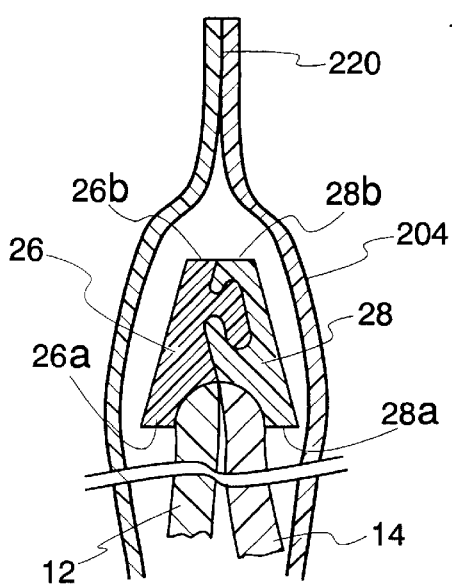
FIG. 16 is a fragmentary cross-sectional view taken along line 16—16 of FIG. 15.
Figure 17:
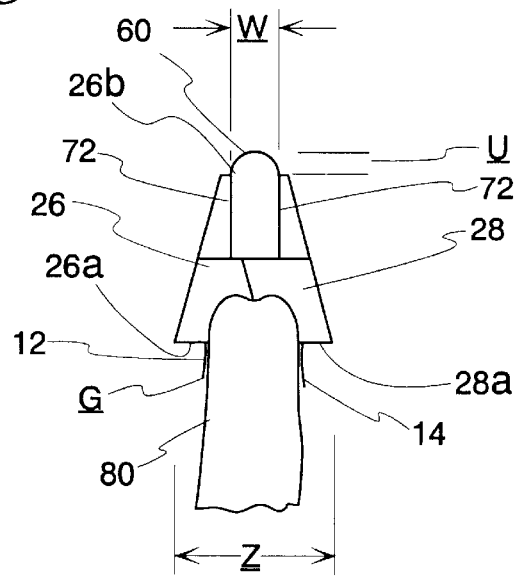
FIG. 17 is a fragmentary end view of the package of FIG. 15.

Turning now to FIGS. 15–18 a flexible package 230 is shown. Package 230 is substantially identical to package 199 described above, except that opening 214 does not directly communicate with diagonal line 212. Tearing of package 230 to remove shroud 204 is initiated at notch 210 and continues along diagonal line 212 to a point of intersection with line of weakness 208. If desired, the portion of weakness line 208 designated by reference numeral 232, line between diagonal line 212 and edge 18 can be omitted, if desired. Further, weakening line 208 and diagonal line 212 can be formed in a single operation using conventional techniques such as laser cutting. As a further alternative, diagonal line 212 can be made to curve either along its entire length, or at the point of intersection with weakening line 208. FIG. 15 shows a central peg hole 234 is formed in upper fin seal 220.

Figure 19:
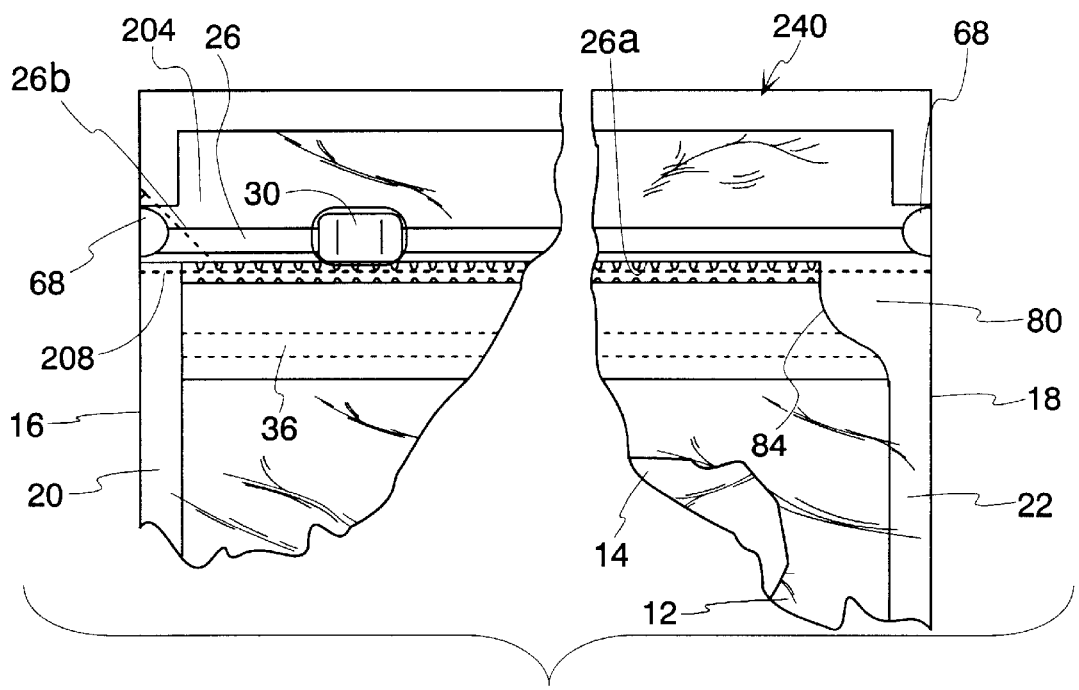
FIG. 19 is a fragmentary elevational view of another embodiment of a shrouded flexible package.

Referring now to FIG. 19, flexible package 240 is substantially identical to flexible package 230, except for the omission of opening 214. Arrangement of FIG. 19 is preferably employed where the width of slider 30 is reduced, or the shroud 204 is sufficiently flexible or has an enlarged cross section so as to completely enclose slider 30 without requiring an opening to relax tension in the material forming the shroud.

Figure 20:
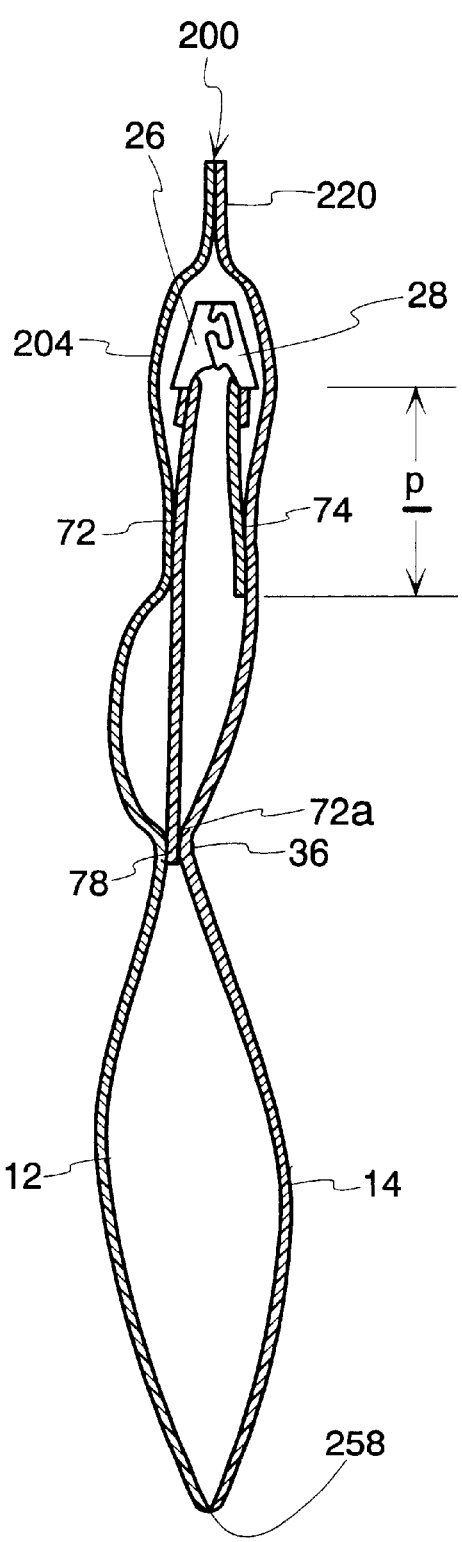
FIG. 20 is a cross-sectional view taken along the line 20—20 of FIG. 15.

Referring now to FIG. 20, a cross section of flexible package 199 is shown. Preferably, shroud 204 is formed as a continuous integral extension of panels 12, 14, the upper free edges of which are joined together to form upper fin seal 220.

Figure 21:
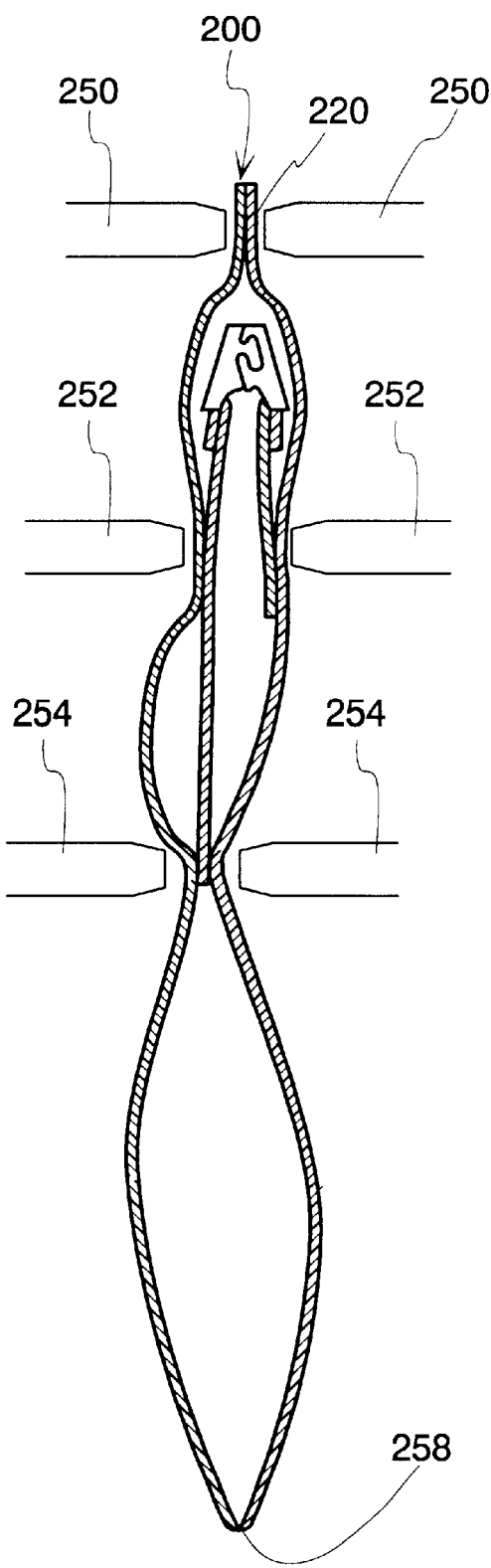
FIG. 21 is a cross-sectional view similar to that of FIG. 20, shown with the schematic depiction of tooling to form the flexible package.

Referring to FIG. 21, exemplary tooling to form the package 199 are shown. For example, a pair of upper seal bars 250 form upper fin seal 220 while a pair of intermediate seal bars 252 join panels 12, 14 to fastener flanges 72, 74. Lower seal bars 254 form the peel seal 36 and weld band 78 (FIG. 20). The bottom of package 199, as is preferred, with the other flexible packages shown herein, is formed by a dead fold 258.

Figure 18:
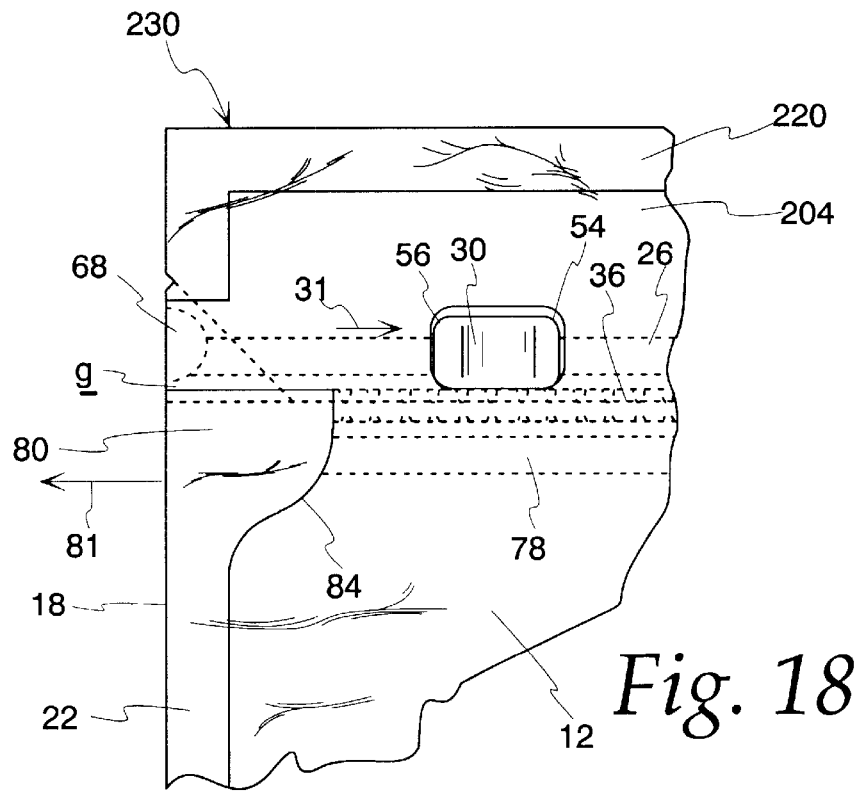
FIG. 18 is a fragmentary elevational view of a further embodiment of a flexible package constructed according to principles of the present invention.
Figure 22:
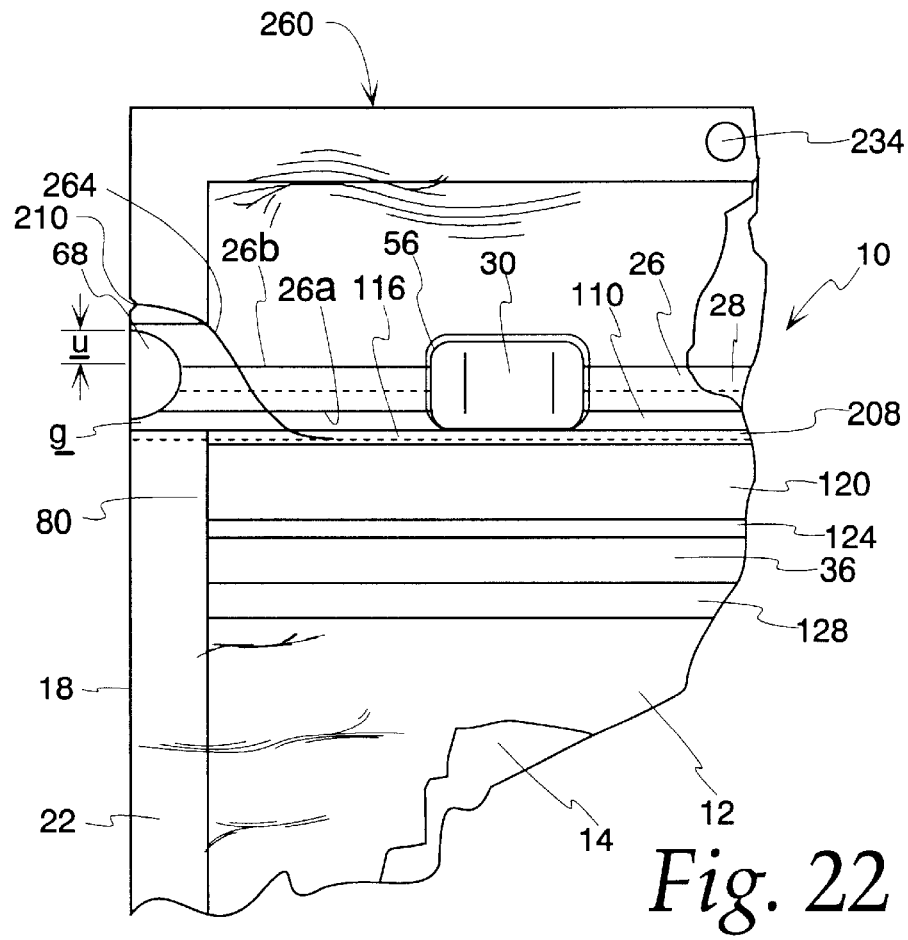
FIG. 22 is a fragmentary elevational view of a further embodiment of a shrouded flexible package.

Referring now to FIG. 22, a flexible package 260 is substantially identical to flexible package 230 of FIG. 18, except for a curved line of weakness 264 joining notch 210 with weakening line 208.

FIG. 23 shows a flexible package 270 similar to that of flexible package 230, except that a large or tapered side seals are provided at each side of the package. Peg holes 132, 140 are formed in the tapered side seal portions and if desired an optionally central peg hole 234 can be formed in upper fin seal portion 220. As with the other embodiments shown herein, it is generally preferred that the enlarged or tapered side seal portions stop short of the line of weakness 208.

FIG. 24 is a cross-sectional view of an optional flexible package 280 substantially identical to flexible package 199, described above, except that a shroud member 282 is separately formed from panels 12, 14 and is joined to the upper ends of the panels by conventional welding or other joining techniques. Most preferably, shroud 282 is joined to the upper ends of panels 12, 14 at the point of sealing with flanges 72, 74. The weakening line for removal of shroud of 282 can be formed either above or below the point of sealing with remainder of the flexible package.

It is generally preferred that textual and graphic information be oriented generally perpendicular to the side edges of the flexible package. If only one peg hole is provided, the package will tend to hang rotated in a vertical plane, according to the distribution of product within the flexible package. With support given to two peg holes 132, 140, the flexible package is oriented in an upright position, making it easier to read the text and graphical information carried on the package. If desired, the text and graphical information printed on the rear panel can be inverted so that a consumer can "flip" the package to inspect the rear panel, without having to remove the package from the support pegs passing through peg holds 132, 140.

Although the package opening, fastener tracks and related features are shown at the upper end of the flexible package, the improved flexible package is intended to cover arrangements in which the opening and related structure is provided on the side or bottom of the flexible package.

Figure 26:
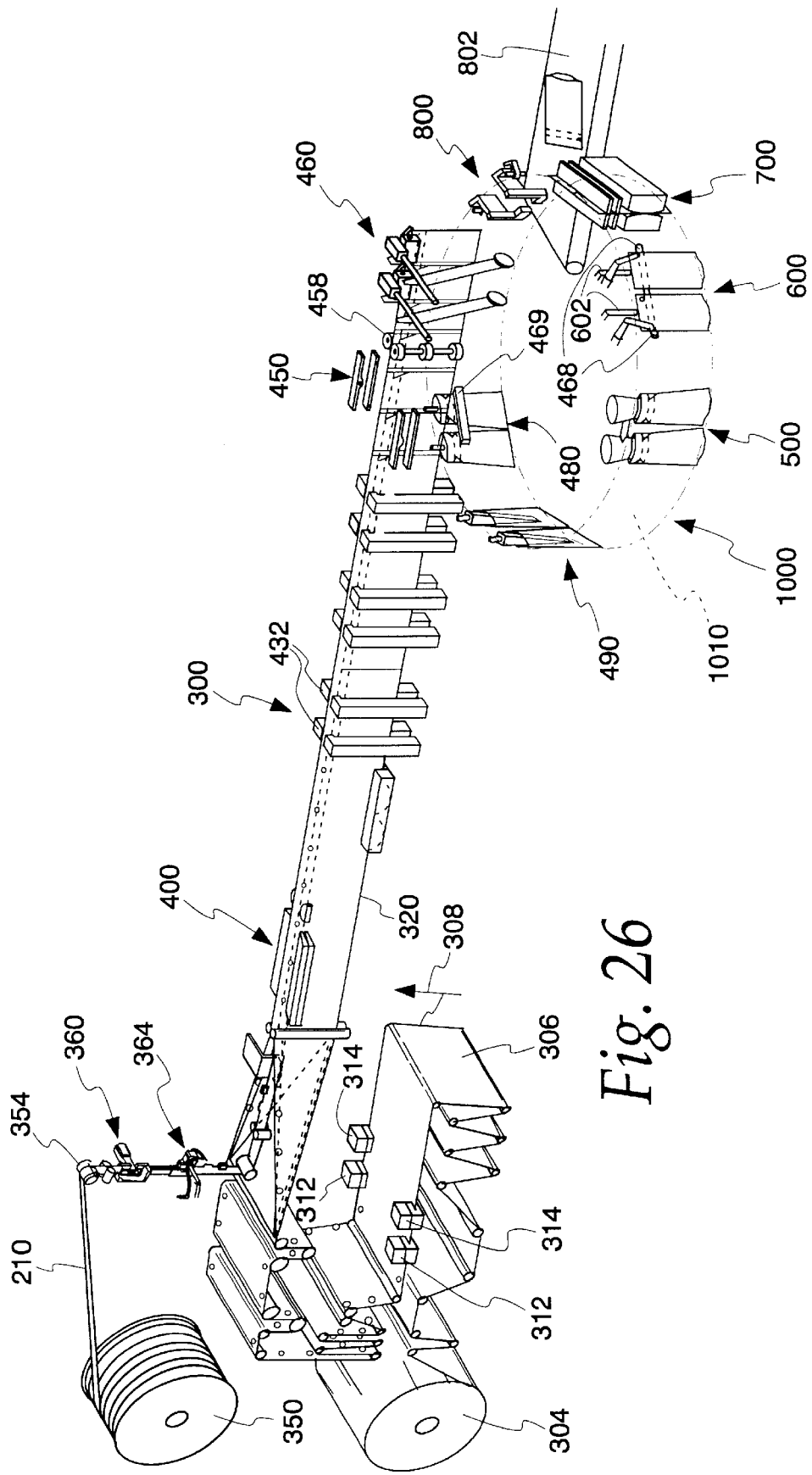
FIG. 26 is a perspective view of apparatus for constructing flexible packages according to principles of the present invention.

Turning now to FIG. 26 and following, apparatus for manufacturing improved flexible packages having slide closures will now be described. As will be seen herein, the apparatus according to principles of the present invention, generally indicated at 300 employs a horizontal form fill seal arrangement with the in-line application of mated fastener tracks to a folded web. And with a rotary station generally indicated at 1000 for package filling sealing and transfer. Apparatus 300 brings all of the required packaging components together, for assembly, at the point of fill.

Figure 27:
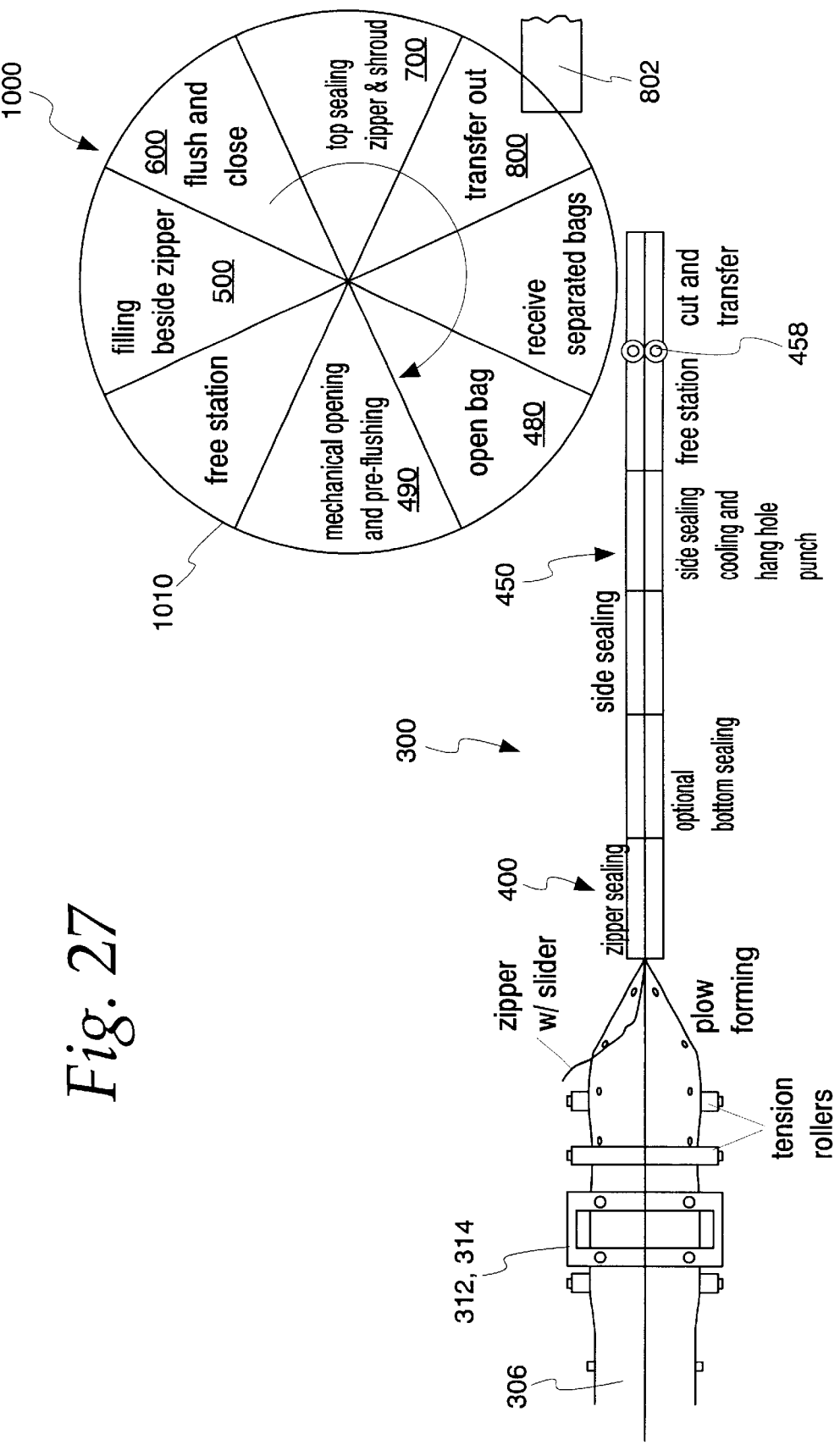
FIG. 27 is a side elevational view thereof.
Figure 28:
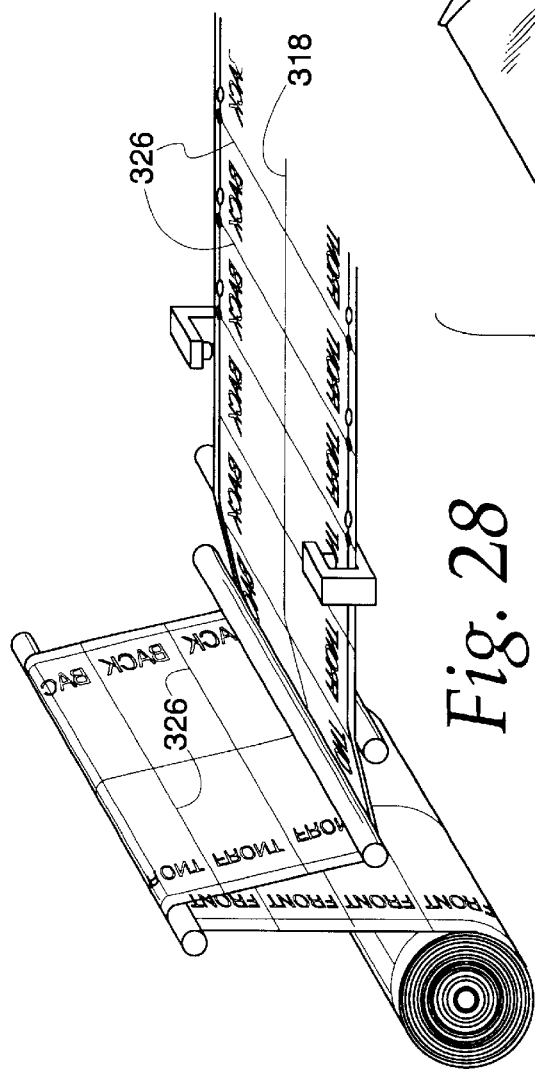
FIG. 28 is a fragmentary view showing the plastic web.
Figure 29:
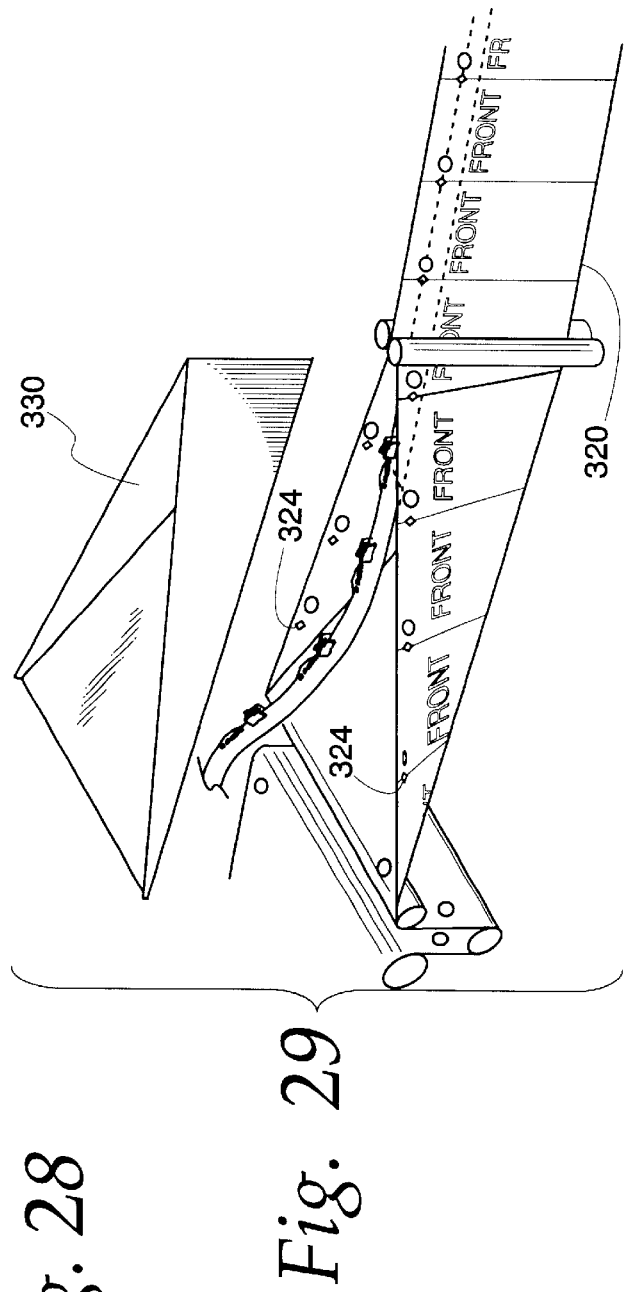
FIG. 29 shows the plastic web being folded.

Referring to FIGS. 26 and 27, apparatus 300 includes a web supply roll 304 providing a supply of web material 306 preferably comprising a conventional plastic packaging film. Web material 306 is advanced in the direction of arrow 308. Punches 312 are schematically indicated and form the openings 214 on opposed bag panel portions 12, 14 (see FIG. 15). Also, indicated in FIG. 29 are diamond shape cutouts 324 formed by punches schematically indicated in FIG. 26 at 312. In FIG. 28 line 318 indicates a crease or a fold line about which web 306 is folded about plow 330 (see FIG. 30) to form a "dead fold" 320 at the bottom of the finished bag, as shown in FIG. 29. The lines 326 running generally transverse of web 206 indicate severing lines which divide one bag portion from another, the bag portions preferably being serially formed from a common web. After severing, the diamond cutouts 324 become pairs of opposed tear notches 210 shown for example in FIG. 39.

As mentioned, the web is initially formed so as to have a "dead fold" at its bottom end. If desired, processing can continue, eventually producing separate bags having dead fold bottoms. As a preferred alternative, a gusset blade 340 can be employed in the manner illustrated in FIG. 30 to form a gusset 342 in the bottom of the folded web. A W-shaped gusset or pleated bottom 342 is shown in greater detail in FIG. 31, and a "Delta-fold" gusset is shown in FIG. 33. The pleated bottoms 324 are sealed as indicated in FIG. 32 using gusset sealing dies 326. The dies 326 include upstanding saw tooth portions 328 configured to seal the corners at side edges of the individual, separated bags.

Referring to FIGS. 26 and 30, a supply of mated fastener track 210 (preferably comprising fastener tracks 26, 28—see FIG. 2) is supplied on roll 350. Preferably, the fastener tracks include respective mounting flanges which overlie one another, and which extend along the mated fastener tracks. As can be seen, the mounting flanges are of unequal height (with the food package viewed in an upright position) and extend from the fastener tracks different amounts. Further details concerning the construction and operation of the mated fastener tracks 210 and slider 30 of the preferred embodiment may be obtained with reference to U.S. Pat. No. 6,047,450, the disclosure of which is herein incorporated by reference.

Figure 34:
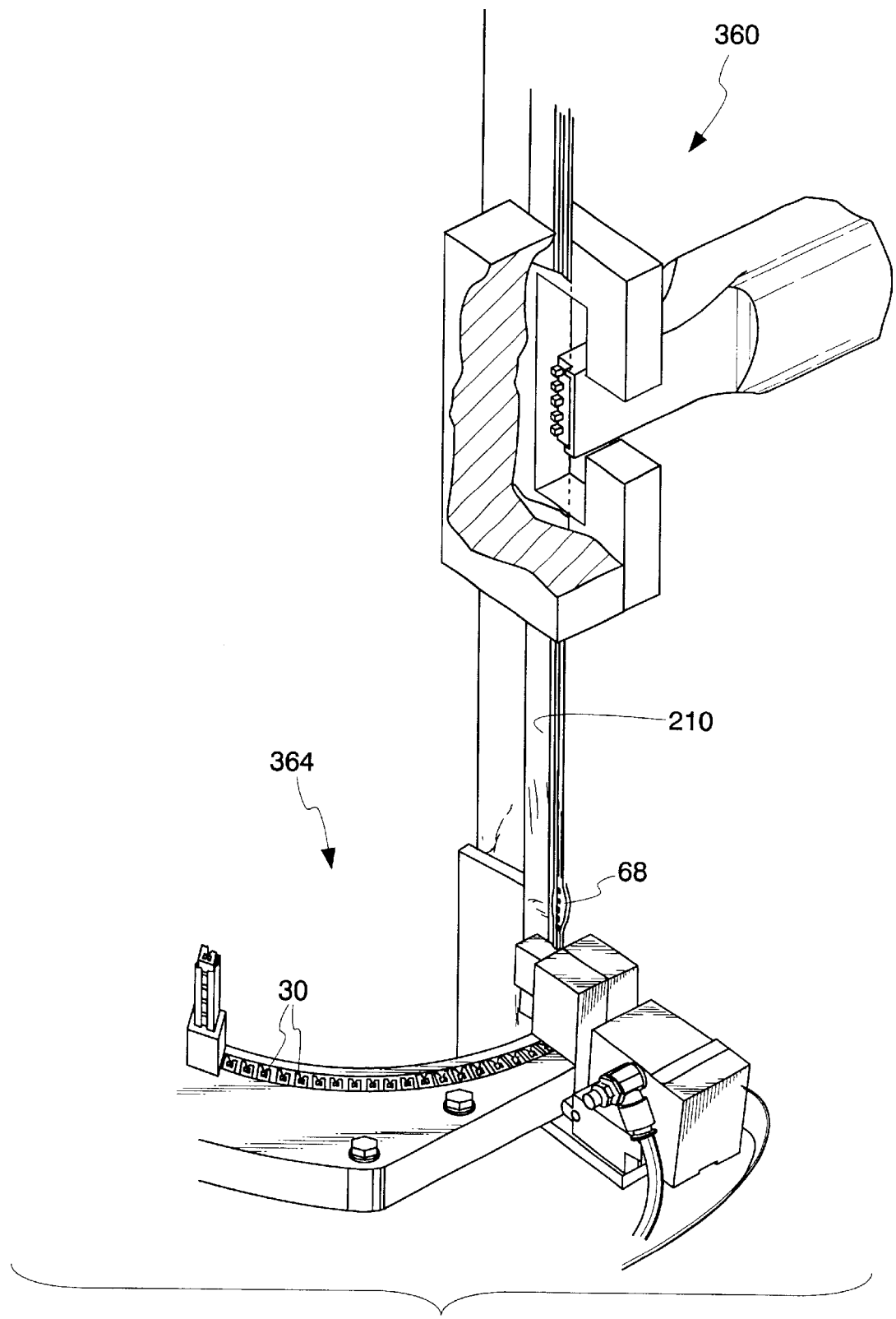
FIG. 34 shows end stop and slider work stations of FIG. 26, taken on an enlarged scale.

With additional reference to FIGS. 26 and 34, the mated fastener track 210 is fed through a roller guides 354 to enter a work station generally indicated at 360 for forming stops 68 in the mated fastener track. An adjacent work station 364 is provided for applying slide members 30 to the fastener track.

Figure 35:
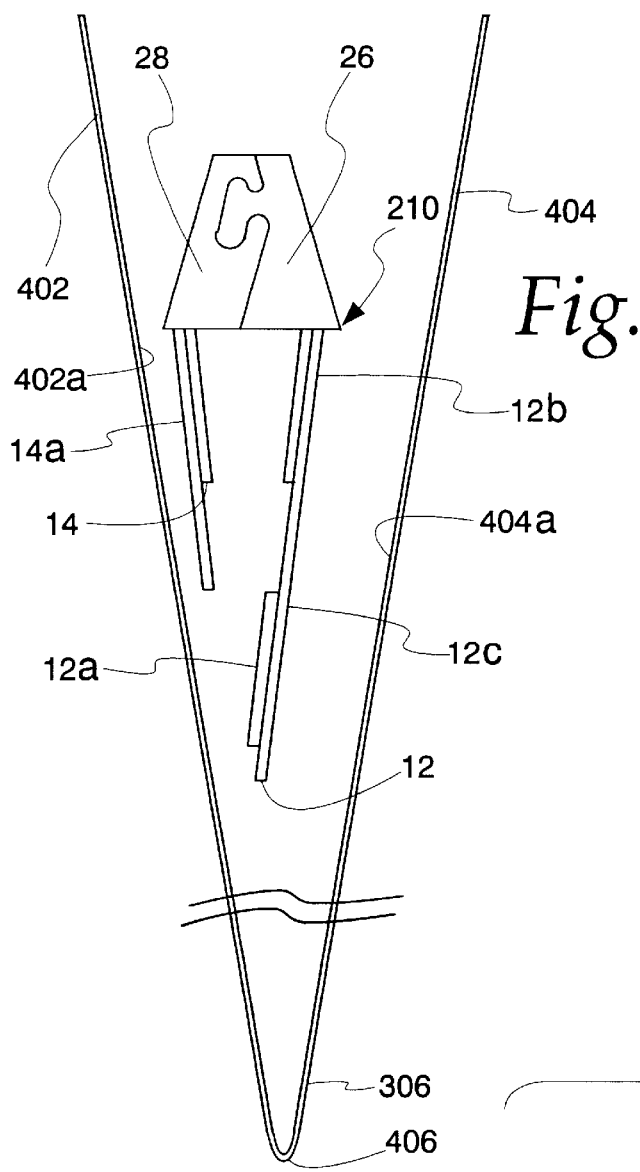
FIG. 35 is a cross-sectional view taken along the line 35—35 of FIG. 30.

Turning again to FIG. 26 and with additional reference to FIG. 30, the prepared zipper track (with end stops and slider members) and the folded web is brought together at fastener sealing station 400. FIG. 35 shows a cross section of the web and fastener track prior to entering the sealing station. As shown, web 306 is folded into a general V-shape to form opposed front and rear panels 402, 404 shown by a dead fold 406. The mated fastener track includes mated male and female track members 26, 28 as described above, for example, with reference to FIG. 2. Track members 26, 28 include a longer depending flange 12 and a shorter depending flange 14, respectively. The side 14a of flange 14 is joined to the opposing interior surface 402a of panel 402, as will be seen herein. Also, the lower surface portion 12a is joined to panel surface 402a. The resulting joinder is diagrammatically illustrated in FIG. 44. After filling the flexible package, the outwardly facing surface portions 12b and 12c are joined to the opposing interior surface 404a of panel 404.

Figure 36:
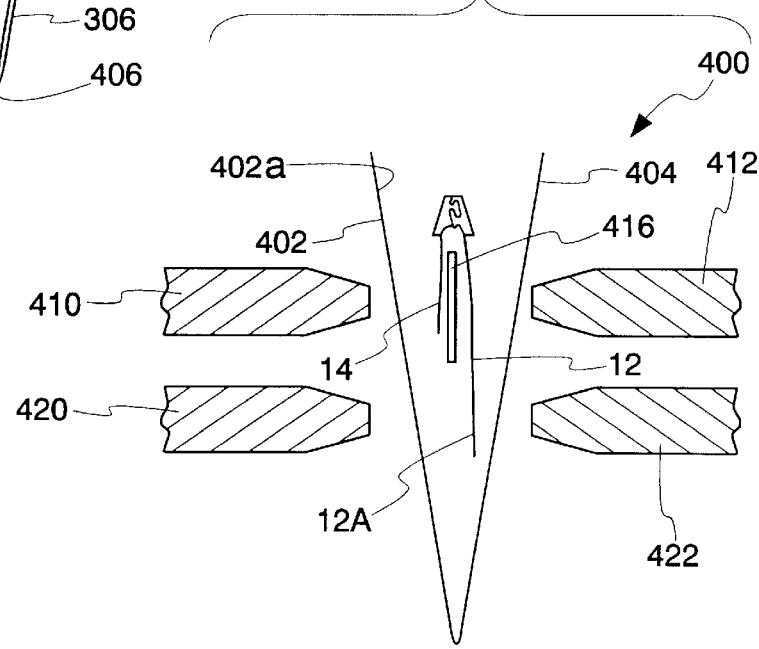
FIG. 36 is a cross-sectional view taken along the line 36—36 of FIG. 30.

The initial sealing of the prepared fastener track to the side wall panels is carried out at station 400, preferably using five sealing tools. With reference to FIG. 36, four horizontal sealing tools are arranged in two pairs. The upper pair of sealing tools or dies includes sealing die 410 adjacent panel 402 and sealing die 412 adjacent panel 404. As will be seen herein, panel 402 preferably comprises the front panel of the flexible package while panel 404 comprises the opposed, rear side of the package. If desired, printing on the front and rear panels 402, 404 could be interchanged one for the other.

Figure 44:
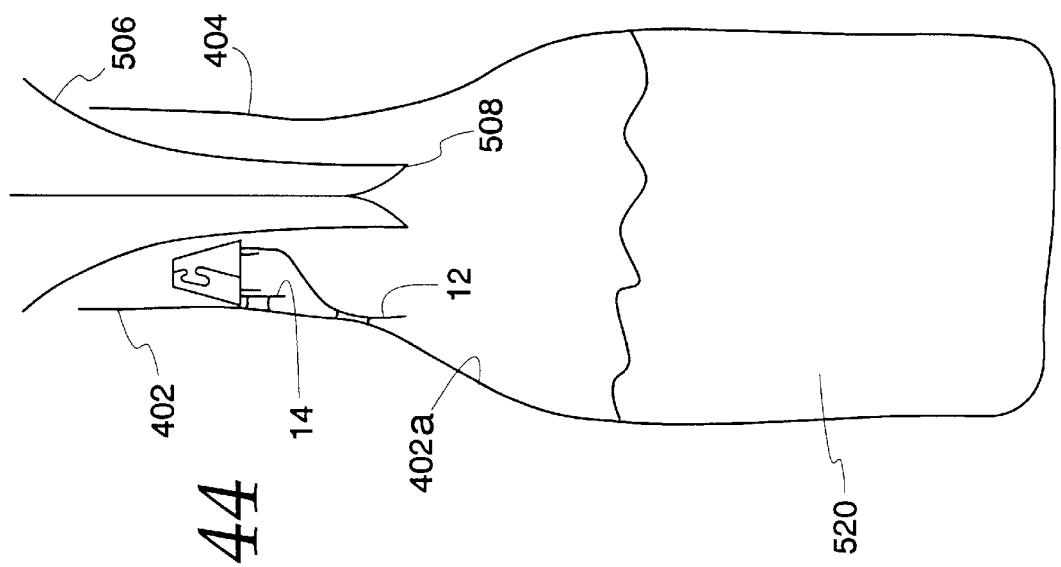
FIG. 44 is a diagrammatic view of FIG. 42.

Flange 14 is welded or otherwise joined to panel 402, but the longer flange 12 remains unjoined to panel 404, to allow package filling as indicated in FIG. 44. Accordingly, sealing tool 410 is heated to a temperature sufficient to cause joining of flange 14 to panel 402. Preferably, sealing is accomplished with the application of pressure and accordingly sealing tool 412 is employed as a back up to sealing tool 410. Preferably, both sealing tools 410, 412 are advanced toward one another, toward separator tool 416. At this stage of the assembly operation, it is preferred that sealing tool 412 be unheated, so as to prevent unwanted joinder of flange 12 to panel 404. In order to prevent inadvertent sealing of fastener flanges 12, 14 by sealing tool 410, an unheated or cooled separator tool 416 is temporarily placed between flanges 12, 14. The joinder of the lower surface portion 12a of flange 12 and panel 402 forms a conventional peel seal whereas the joinder of flange 14 to panel 402 comprises a permanent seal.

As mentioned, it is preferred that flange 12 remain free of joinder with panel 404. However, it is desired that the lower portion of interior face 12a be joined to panel 402. Accordingly, a pair of sealing tools 420, 422 are advanced toward one another to bring flange face 12a in contact with the opposed interior surface 402a of panel 402. Accordingly, sealing tool 420 is heated to effect the desired joinder, but sealing tool 422 is either cooled or unheated to prevent joinder of flange 12 to panel 404.

Figure 37:
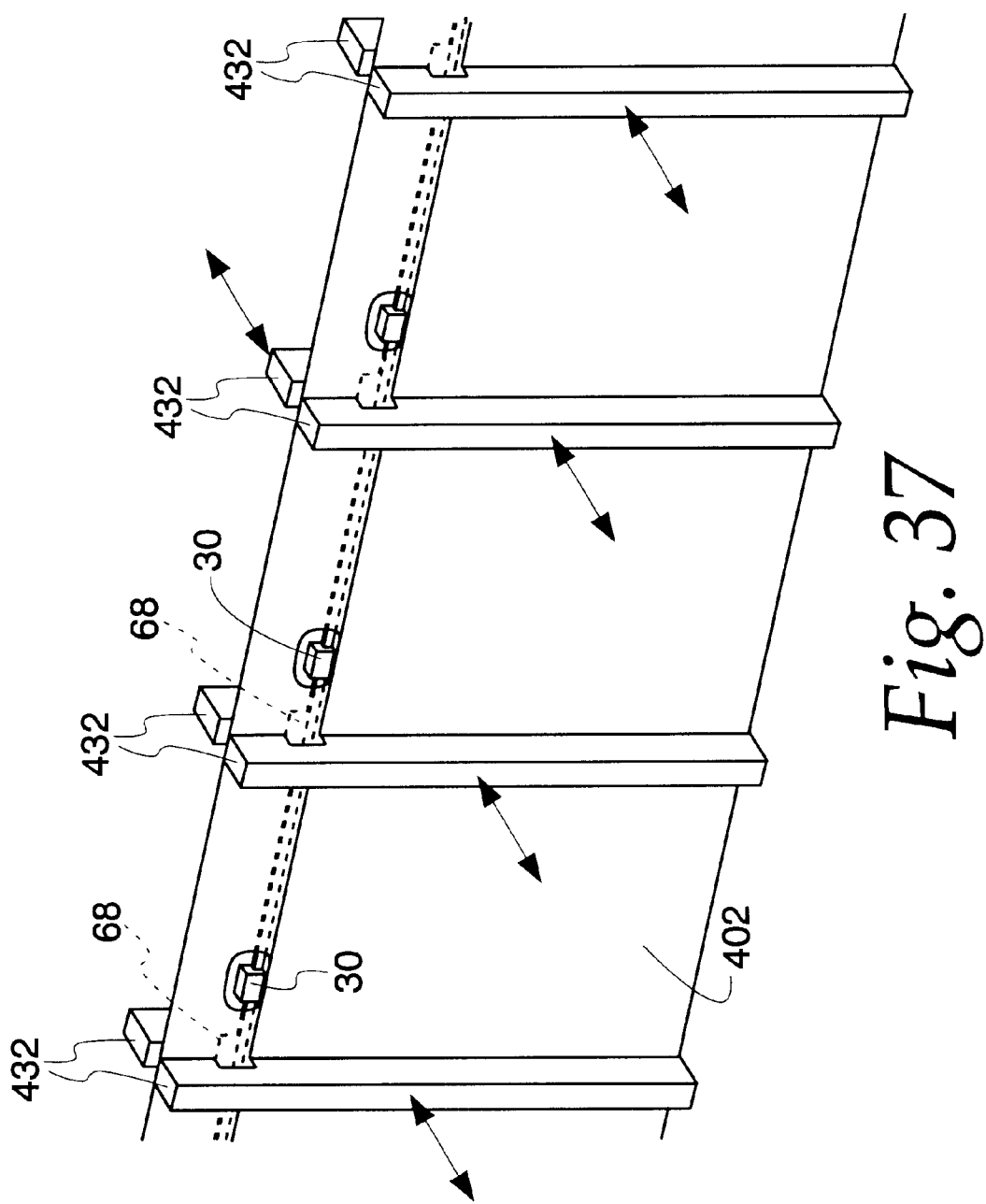
FIG. 37 shows a vertical sealing work station portion of FIG. 26.
Figure 38:
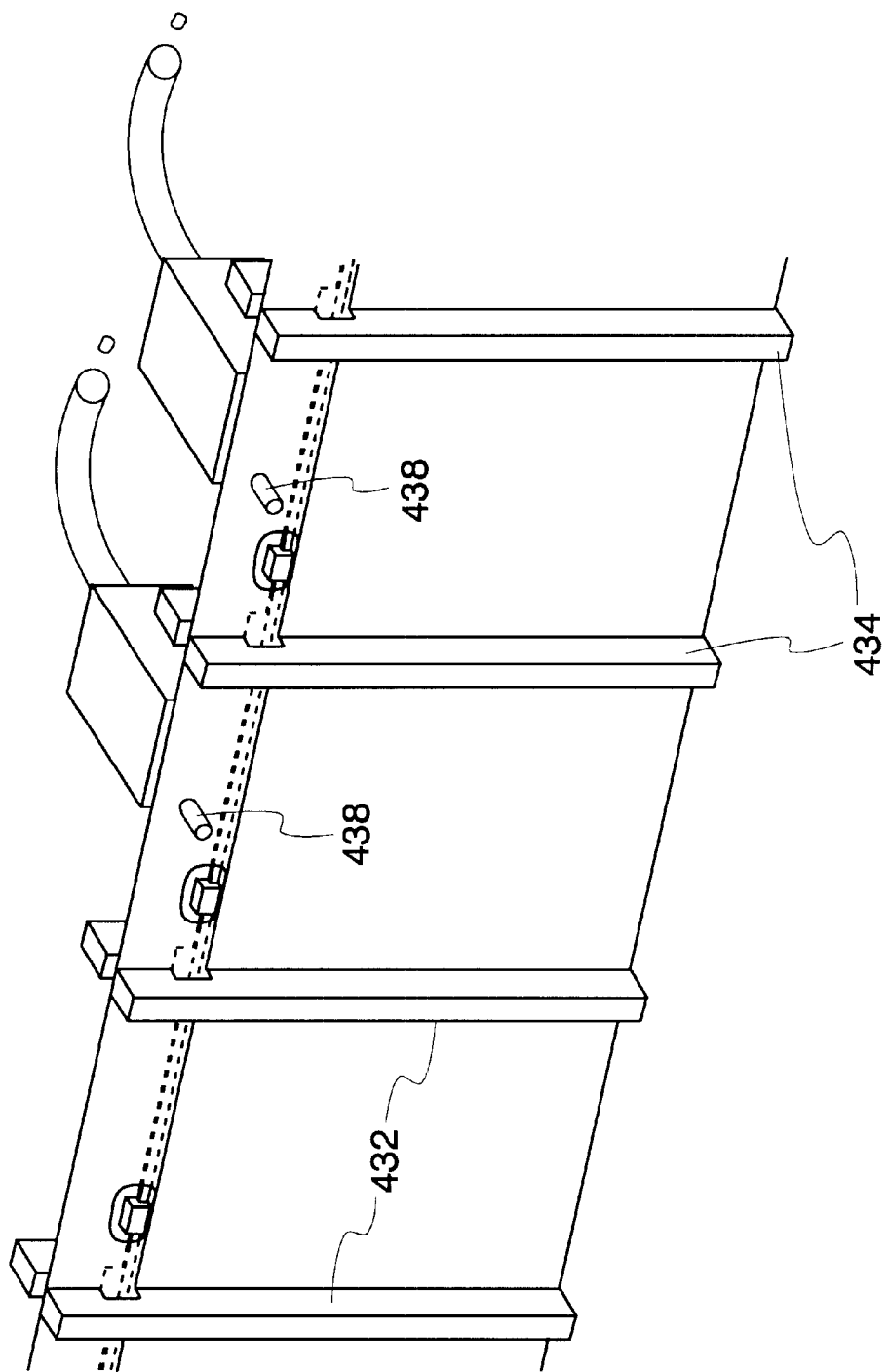
FIG. 38 shows a portion thereof on an enlarged scale.

Turning now to FIGS. 37 and 38, the joined web and prepared fastener tracks are advanced to the station 430. With reference to FIG. 26, pairs of vertical sealing bars 432 cooperate to form side seals for the flexible package. With reference to FIG. 28, side seals are formed along lines 326 and with reference to FIG. 39, for example, the side seals are indicated by 20, 22. FIG. 39 shows a completed flexible package 200. Referring also to FIG. 25, it can be seen that the side seals stop short of end stop 68, so as to provide an intervening spacing. In this manner, unwanted deformation of the end stop is avoided as the side seals are formed. Accordingly, the vertical sealing bars 432 are foreshortened with respect to the overall height of the flexible package.

In the preferred embodiment, sealing bars 432 have heat loadings optimized for rapid assembly. Accordingly, it has been found desirable to add vertical cooling bars 434 at a downstream position to withdraw heat from the side seals. As mentioned above, the vertical sealing bars are foreshortened with respect to the overall height of the flexible package. The vertical cooling bars could also be foreshortened in a similar manner, since their function is to withdraw excess heat lingering after fusion of the side seals is completed. Alternatively, the cooling bars can extend upward beyond the side seals, if desired. If desired, additional operations such as operating on the side panels with punches 438 while the bag chain is temporarily stopped at station 430. Punches 438 are preferably employed to clear plugs from the package tops, but can also be employed, for example, to form side holes 132, 140 as shown in FIG. 14 or center hole 234 as shown, for example, in FIG. 15. If desired, the punching operation or other operations on the bag panels can be carried out at station 450 located immediately downstream of station 430.

The lower portions of the flexible packages or bags are now fully formed except for being connected together in serial succession in the form of a bag chain or series of folded package portions. Top filling and final sealing of the upper end of the flexible packages remains to be accomplished. If desired, the filling and final, top sealing could be performed with the flexible packages serially connected in a bag chain. However, it is preferred that the individual, partially formed flexible packages be separated from one another at station 460.

Figure 40A:
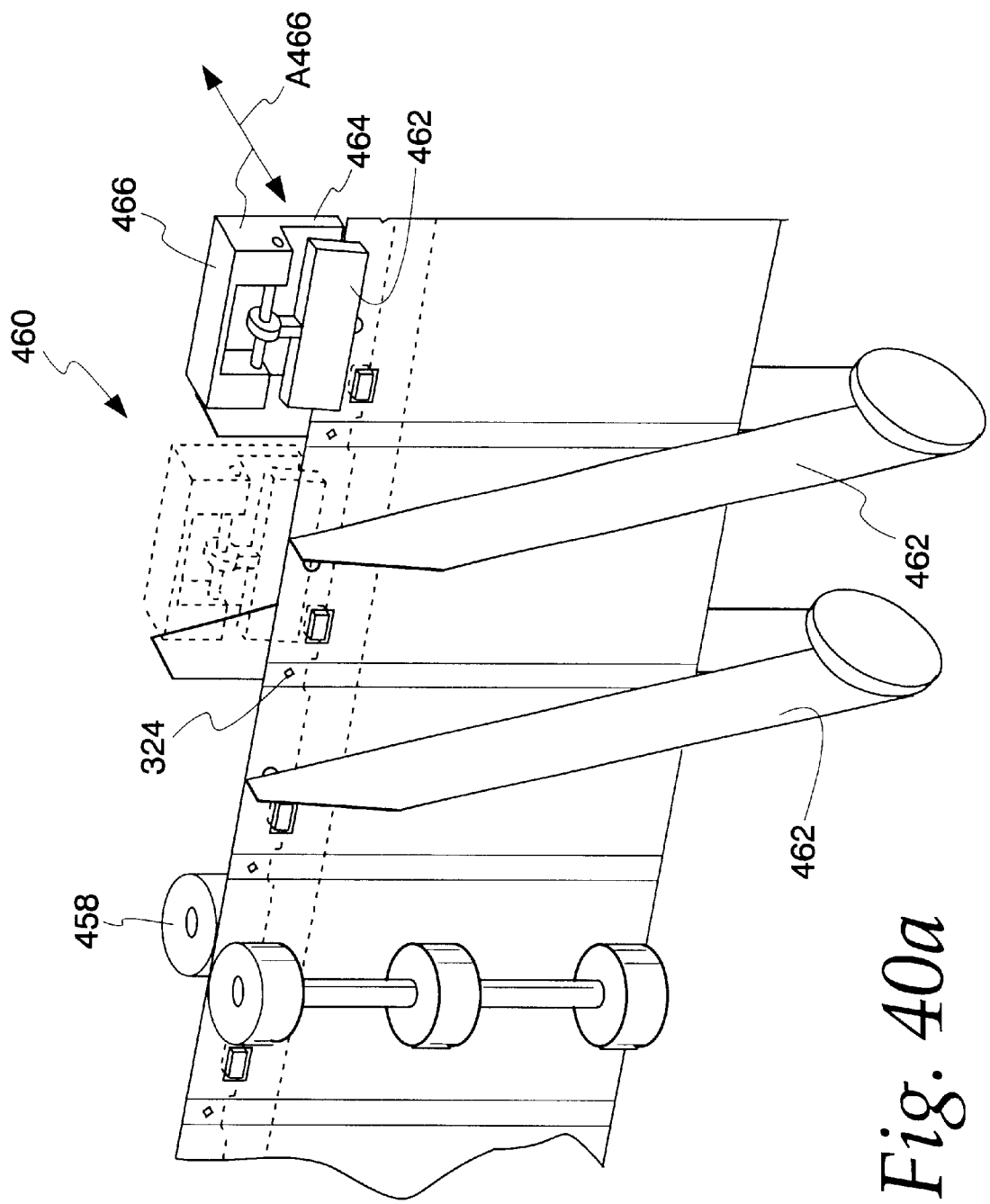
FIGS. 40a and 40b show the severing work station of FIG. 26, on an enlarged scale.

With reference to FIGS. 26, 27 and 40a, the serial succession of partly formed flexible packages is driven in the machine direction by roller drive 458. As mentioned, it is preferred that the web be driven in an intermediate fashion so as to bring various parts of the web into registry with the various work stations which perform successive operations on a particular package portion, as the package portion and the overall web are advanced in a downstream or machine direction. Controls for the web drive can take any number of conventional forms. Although supplemental web drives could be employed, it is generally preferred that the web drive 458 act alone in pulling the web past the folding station and stations downstream. As can be seen with reference to FIG. 26, a relatively small portion of the web is pushed by web drive 458. The portion of the web has had a number of sealing operations preformed on it and accordingly is sufficiently stiff to accommodate the relatively short distance pushing displacement to align the folded package portions at downstream station 460.

With reference to FIG. 40a, a series of knives 462 are employed to sever the bag chain to separate the empty, partially formed flexible packages at the end of the bag chain. Knives 462 are aligned so as to intersect the diamond-shaped openings 324, forming opposed V-shaped notches in side seals of adjacent flexible packages.

Figure 40B:
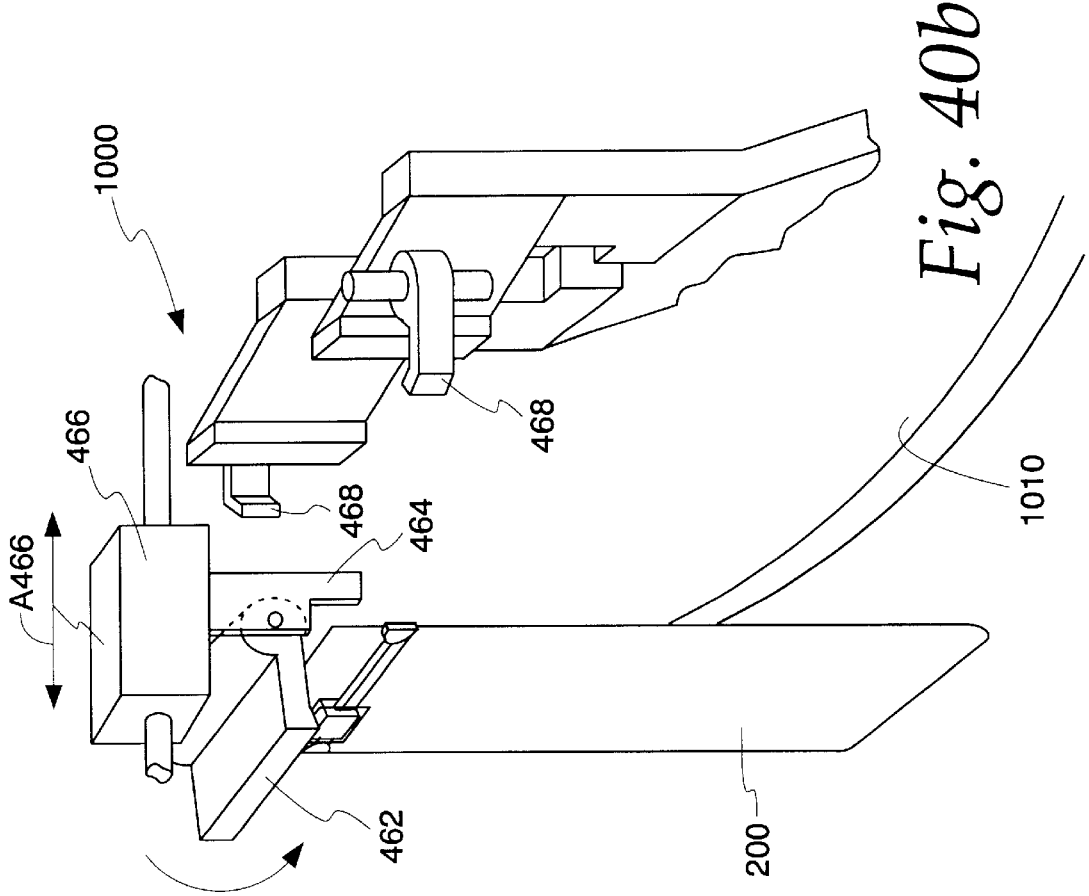

With reference to FIG. 39, for example, the notches formed are identified by 210. It is generally preferred that V-shaped notches be formed in both side seals of the flexible packages. It is generally preferred that the portions of the bag chain be supported prior to the severing operation so as to maintain positional control of the severed flexible packages. Any of a number of conventional supports, such as vacuum operated suction cups can be employed for the purpose. As illustrated in FIGS. 40a, 40b the flexible packages are mechanically secured between a moveable clamp member 462 and a fixed clamp blade 464. The clamp blades are carried on a shuttle member 466 moveable back and forth in the direction of arrow A466. As indicated in FIG. 40b, shuttle 466 moves a flexible package 200 toward a turntable 1010 located at station 1000 provided for the fill, seal and transfer operations to be formed on the flexible package. After an individual flexible package 200 is separated from the web chain, the packages conveying to turntable 1010 by shuttle 466 with the sides of the flexible package being secured by clamping fingers 468 supported by turntable 1010.

Figure 50:
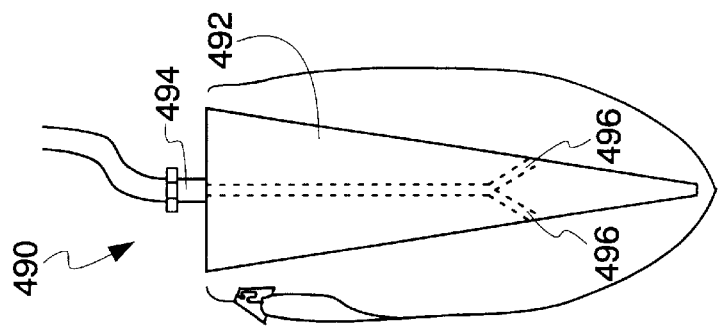
FIG. 50 shows a cross-sectional view taken along the line 50—50 of FIG. 49 with the opening member shown fully inserted in the flexible package.
Figure 49:
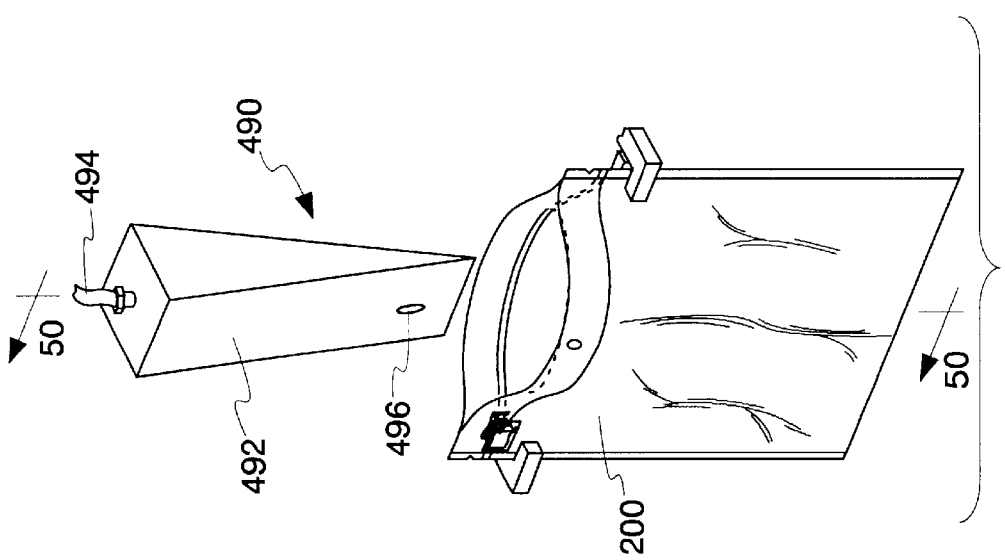
FIG. 49 shows the opening and pre-flushing station of FIG. 26, taken on an enlarged scale.
Figure 48:
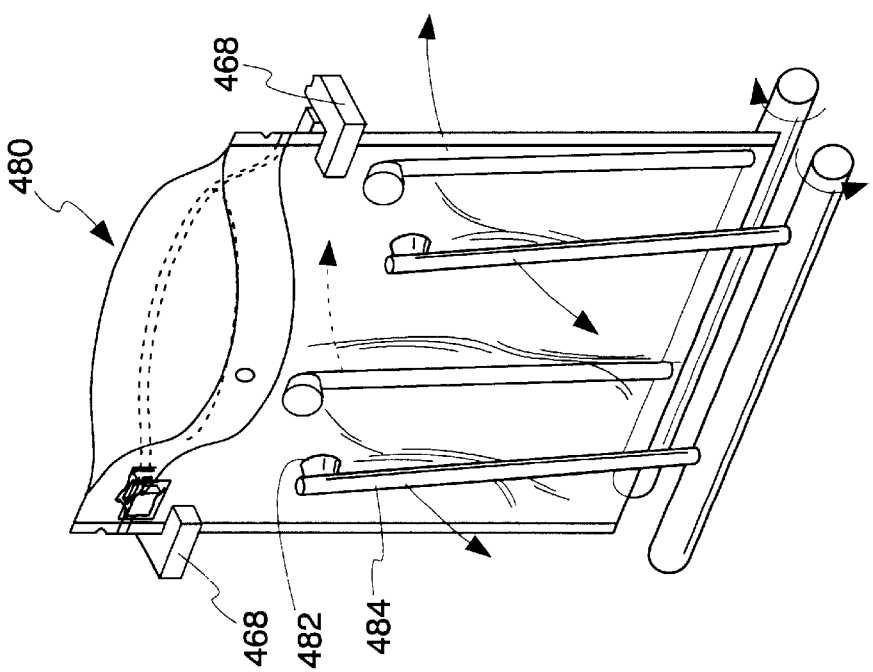
FIG. 48 shows the bag opening station of FIG. 26, taken on an enlarged scale.

Referring again to FIG. 26, upper suction cups 469 are diagrammatically illustrated as spanning a pair of partially formed flexible packages. Preferably, a pair of suction cups 469 are employed, on opposite sides the flexible packages so that, by withdrawing the suction cups away from one another, the upper ends of the flexible packages are opened. Preferably, however, the upper ends of individual flexible packages are opened by vacuum cups 482 carried on arms 484. Turntable 1010 is then indexed to bring the flexible packages to work station 490 where a wedge-shaped mechanical opener 492 is inserted in the flexible package in the manner indicated in FIG. 50. Referring additionally to FIG. 49, the wedge-shape member 492 includes an inlet 494 for an inert flushing gas. Internal passageways connect the inlet 494 to a pair of outlet openings 496. At station 480 interior portions of the flexible packages are inflated in a gas flushing operation. Any suitable gas mixture could be employed, although it is generally preferred that an inert gas for gettering or otherwise displacing oxygen is employed. The separated, but incompletely formed, flexible packages are advanced to filling station 500 with indexing of turntable 1010.

Figure 43:
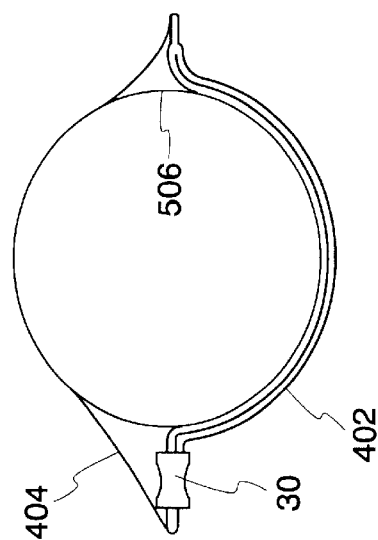
FIG. 43 is a top plan view thereof.

With reference to FIGS. 41–44, filling is carried out using conventional duck bill members 506. As schematically indicated in FIG. 44, filling is carried out between the mated fastener track and panel 404 with the bottom end 508 of the duck bill member being positioned at, or more preferably below flange 12. Referring to FIG. 43, a wide opening is provided by the duck bill arrangement nested within the opening formed between the zipper track and unjoined package panel. A relatively large size opening provided allows manufacturers to pour products into the flexible packages at relatively high production line speeds, a feature attractive for mass production. The bottom end of flange 12 is schematically indicated in FIG. 44 as separated from panel 402. This arrangement is shown only for illustrative purposes, it being preferred that the bottom end of flange 12 be joined to panel 402 to prevent product from backing up above the peel seal. Positioning the bottom end of the filling apparatus beneath the peel seal for prevention of unwanted product backup.

Figure 41:
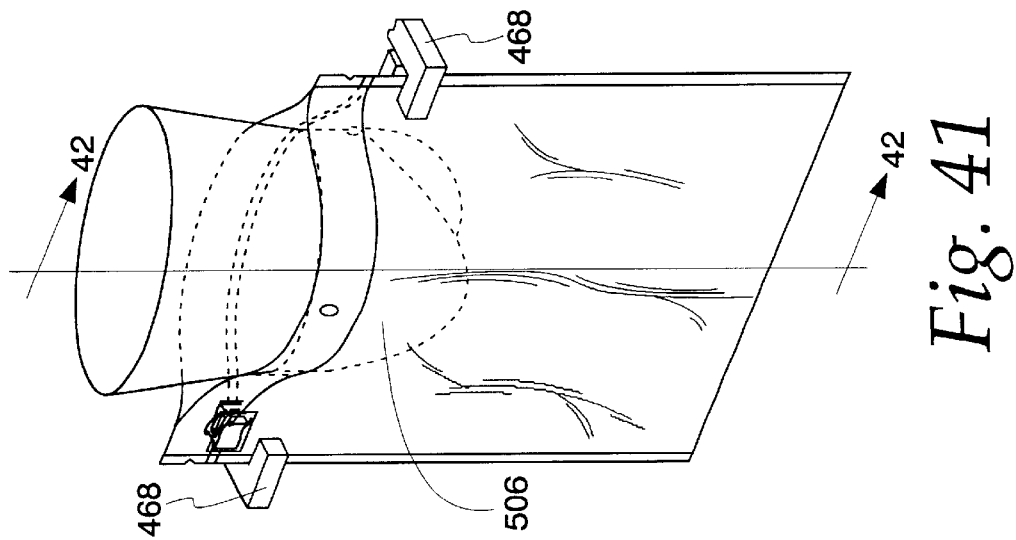
FIG. 41 is a perspective view showing filling of a flexible package.
Figure 42:
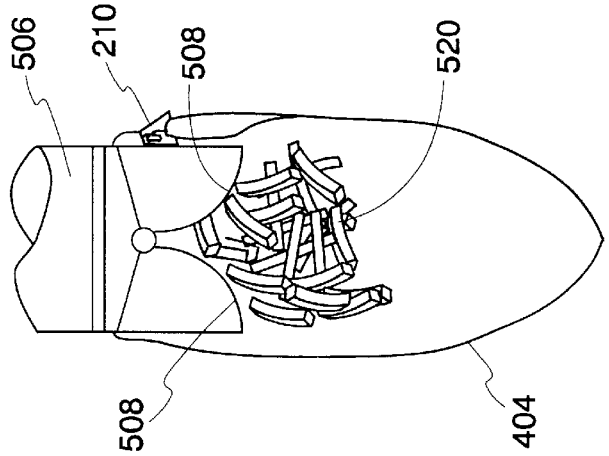
FIG. 42 is a side elevational view thereof.

Turning now to FIGS. 41 and 42, the duck bill filling apparatus 506 preferably has an articulated clam shell configuration. The bottom ends 508 of the clam shell members are initially brought together so as to facilitate penetration into the interior of the flexible package. Once the filling apparatus is successfully inserted into the package interior, the filling apparatus is advanced until the lower ends 508 are plunged below the lower end of flange 12. The clam shell members are then opened in the manner indicated in FIG. 42 to allow product 520 to drop into the flexible package.

Figure 46:
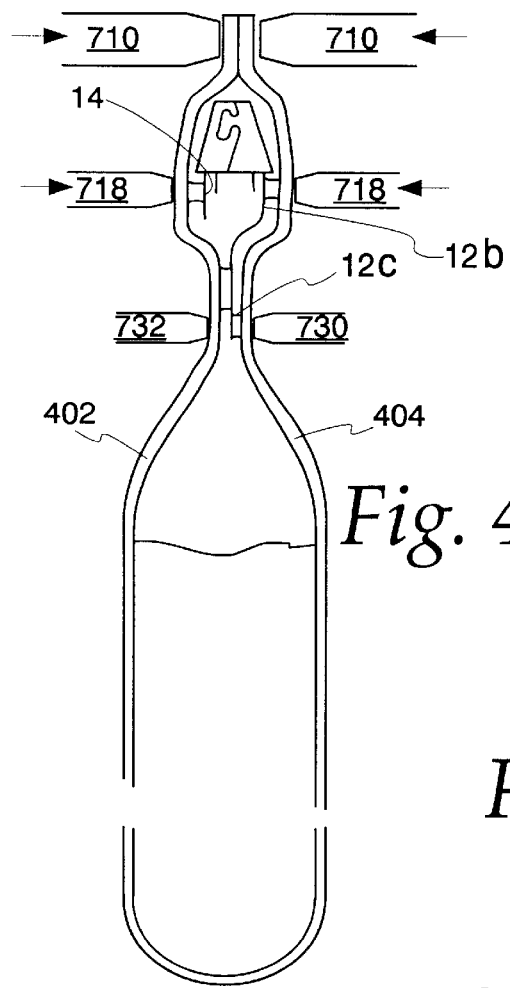
FIG. 46 is a cross-sectional view taken along the line 46—46 of FIG. 45.
Figure 47:
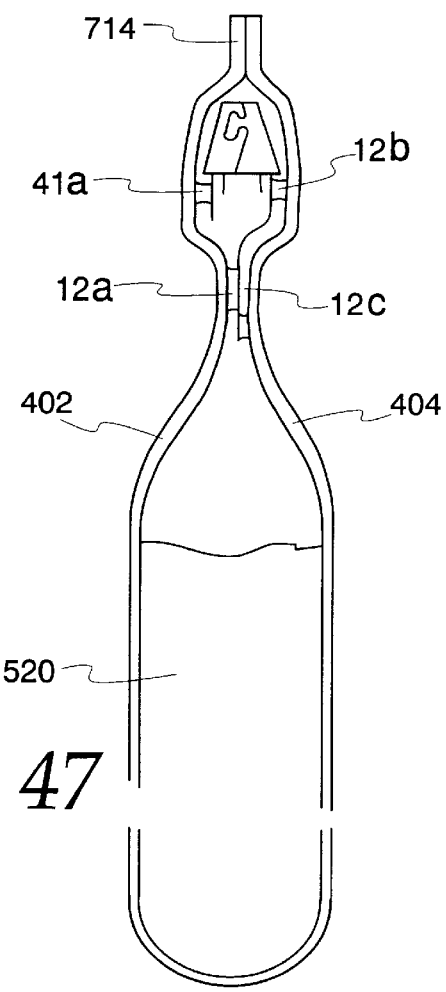
FIG. 47 is a cross-sectional view taken along the line 47—47 of FIG. 39.
Figure 45:
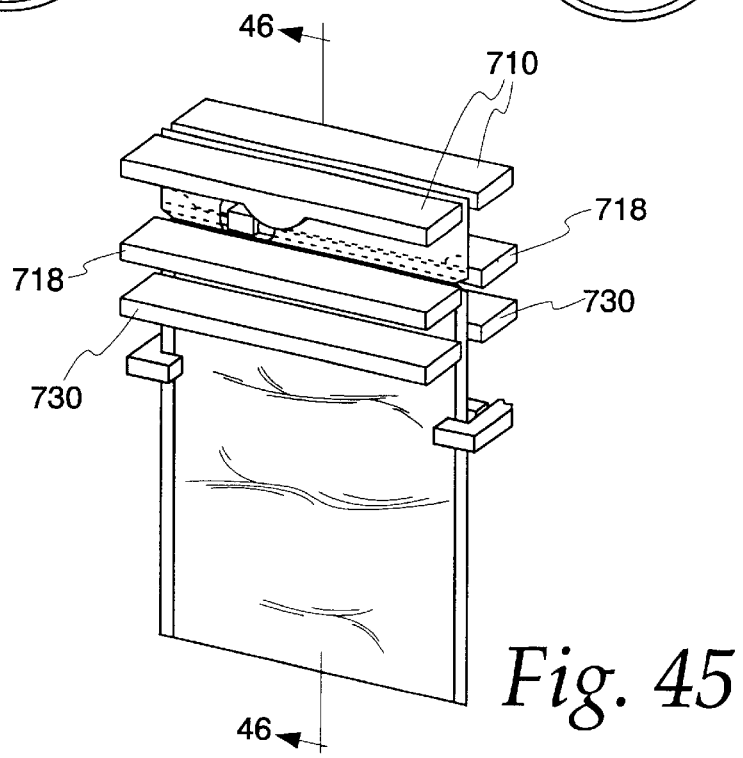
FIG. 45 shows a top sealing work station of FIG. 26.
Figure 51:
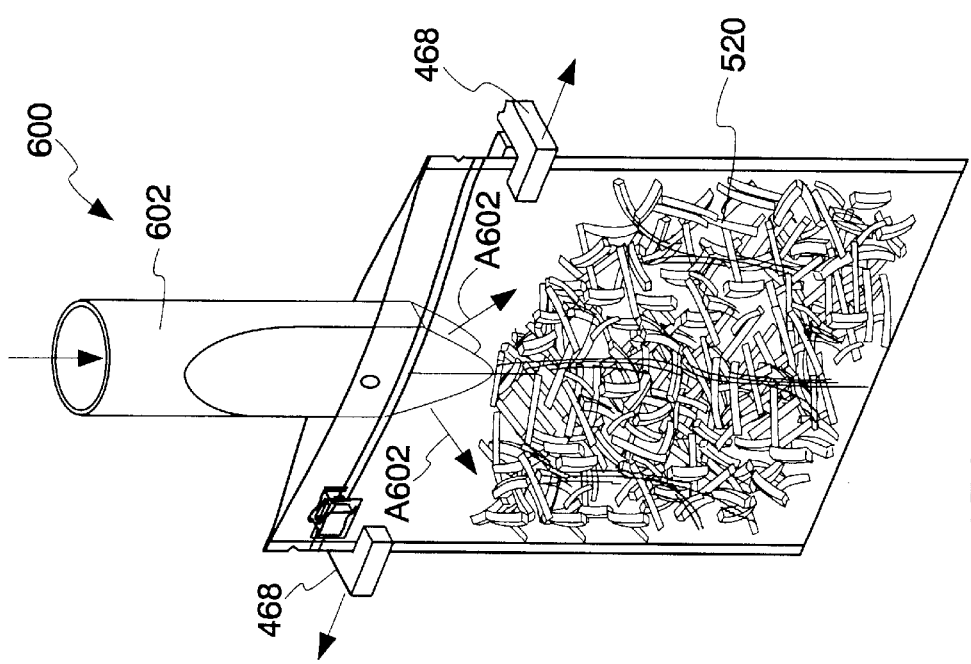
FIG. 51 shows a post-filling gas flushing operation.

The turntable is then indexed to bring the filled package to station 600 where the package is flushed, and then closed. Referring to FIGS. 26 and 51, initially to FIG. 51, a gas flushing probe 602 is inserted in the open end of the filled package. Probe 602 is hollow so as to direct a stream of flushing gas in the direction of arrows A602, preferably, to displace oxygen within the package interior. With filling and flushing of the flexible package being completed, a final preparation step before top sealing is performed. With reference to FIG. 26, conventional, linear stretching apparatus using movable clamps 468 bring the top ends of the package side walls together. With indexing of turntable 1010, the flexible packages are then advanced to top sealing station 700 where the top seals are formed. With reference to FIGS. 45 and 46, three pairs of sealing bars are employed. The uppermost pair of sealing bars, identified by 710 form the upper seal of the shroud indicated at 714 in FIG. 47.

The intermediate pair of sealing tools identified by 718 form the fusion seal between portion 12b of flange 12 and panel 404. In order to complete the desired seal, the right-hand seal tool 718 is heated whereas the left-hand seal tool 718 is either unheated or cooled, to provide backup so that pressure can be developed during the sealing operation.

Finally, the lower end 12c of flange 12 is joined to panel 404 by a heated sealing tool 730 and a cooperating unheated or cooled seal tool 732. The resulting fusion seal is located laterally adjacent to the peel seal described earlier with reference to flange portion 12a.

Figure 52:
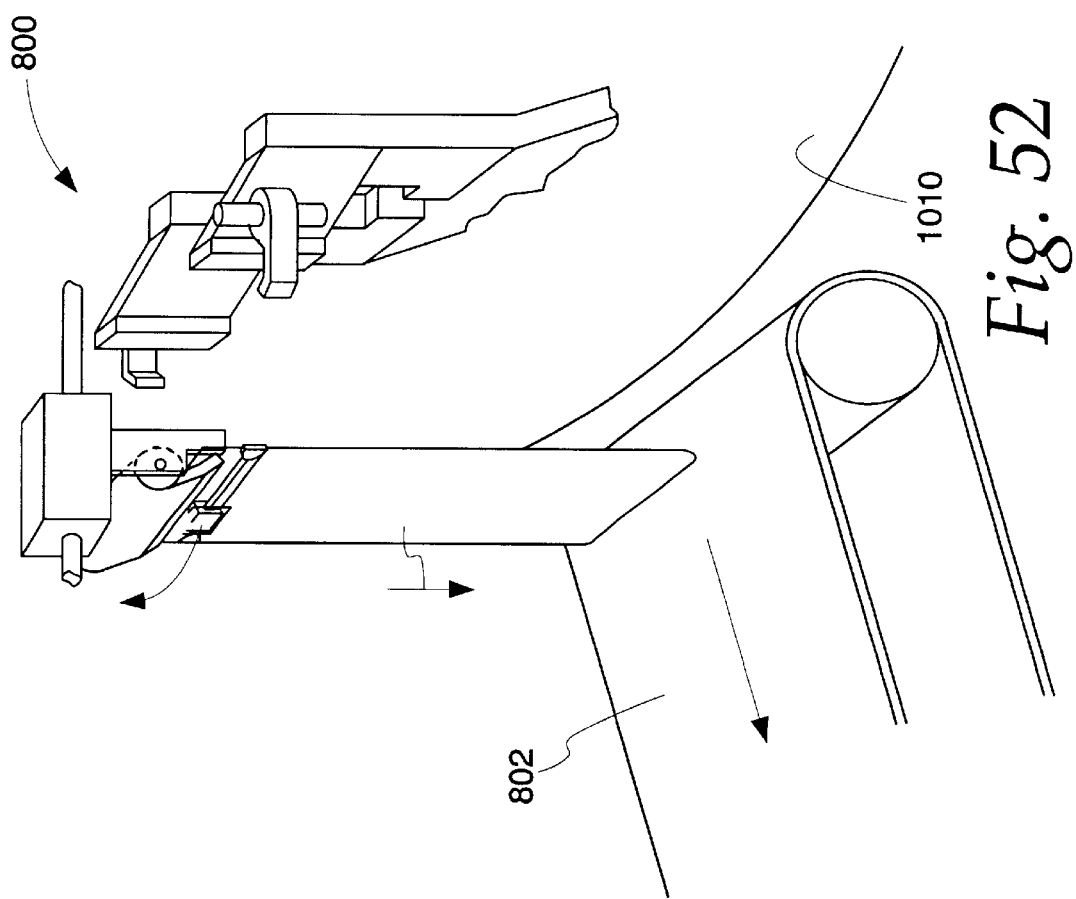
FIG. 52 shows the transfer station of FIG. 26 on an enlarged scale.

Referring to FIGS. 26 and 52, turntable 1010 is then indexed to bring the fully formed, filled and sealed flexible packages to a transfer station 800 where the flexible package is released by the clamping plates, so as to drop onto a transfer conveyor 802.

A flexible package having a removable shroud covering a slide fastener has been shown. However, it should be readily apparent for those skilled in the art that apparatus 300 can readily form, fill and seal flexible packages, such as those illustrated above in FIG. 1, for example, which lack the shroud feature.

In addition to advantages described above with reference to the apparatus and method of filling flexible packages, it will be appreciated that the reclosable fastener tracks remain engaged or mated in the closed position throughout the forming, filling and sealing of flexible packages constructed according to principles of the present invention. This reduces the number of unit operations which would otherwise be required to open and reclose the fastener tracks. Further, the working surfaces of the fastener tracks are not exposed to product, dust and particles, which could interfere with reliable mating of the fastener tracks, and the ability of the slider member to move freely. As indicated, for example, in FIG. 35 the longer flange is preferably associated with the male fastener track 26. As seen above, the longer flange, at its bottom end, forms a peel seal with a package panel. The shorter flange, associated with the female fastener track 28 is permanently joined to the package panel at an early stage of operation. The anchoring of the flange carrying the female track 28 onto the side panel of the bag and the application of the peelable seal on that same side panel of the bag, associated with the male fastener track, provides a unique insulation of the reclosable top the flexible package during the filling and gas flushing. This construction creates a laminar flow of the purging gas (preferably nitrogen or carbon dioxide) that effectively sweeps residual oxygen from the unfilled flexible package. As those skilled in the art of packaging foods and other products are aware, this feature of the invention is oftentimes found essential to provide a modified atmosphere for packaging, which preserves the freshness of the product being packaged.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed:

1. A method of making a flexible package for food products, comprising the steps of:
   providing a supply of web material defining a serial succession of package sidewalls;
   paying out a first portion of the web material;
   providing a supply of mated fastener tracks, including a first track with a shorter flange mated to second track with a longer flange;
   paying out a first portion of the mated fastener tracks;
   crushing a serial succession of spaced apart portions of said mated fastener tracks to form a serial succession of spaced apart slider stop portions;
   folding the web material to form a serial succession of folded package portions, each folded package portion having overlapping first and second package sidewalls with overlying free ends and shroud portions at the free ends, and intermediate portions spaced from the shroud portions;
   aligning the mated fastener tracks in-line with the intermediate portions;
   providing a supply of sliders;
   dispensing the sliders one at a time;
   inserting sliders on the mated fastener tracks;
   sealing at least a part of the first fastener track flange to the intermediate portion of said first package sidewall;
   forming a peel seal between a portion of the second fastener track flange and a portion of said first package sidewall at a point below said fastener tracks;
   forming transverse, side seals for each package portion to cooperate with said sidewalls to form a pouch;
   severing the pouch from the web material and mated fastener tracks to form a separate flexible package;
   providing a turntable;
   transferring the separate flexible package to the turntable;
   separating the overlying free ends of the package portions to form an opening between the fastener tracks and the second package sidewall and between the peel seal and the second package sidewall;
   filling the pouch while on the turntable with product through the opening;
   sealing a portion of the second fastener track flange to the intermediate portion of said second package sidewall to close the opening;
   sealing free edges of the package sidewalls while on the turntable to form a shroud enclosing said mated fastener tracks to thereby form a completed food package; and
   transferring the completed food package away from the turntable.

2. The method of claim 1 wherein the step of inserting the slider is performed before the step of sealing at least a part of the first fastener track flange to the intermediate portion of said first package sidewall.

3. The method of claim 1 further comprising the steps of forming a weakening line in at least one of said sidewalls generally coextensive with said mated fastener tracks.

4. The method of claim 1 further comprising the step of forming a slider-receiving opening in at least one of said sidewalls to receive a portion of said slider.

5. The method of claim 1 wherein the step of sealing at least a part of the first fastener track flange to the intermediate portion of said first package sidewall comprises the step of providing a heat shield and inserting the heat shield between the flanges while applying heat and pressure.

* * * * *